(12) United States Patent
Mihara

(10) Patent No.: US 7,973,791 B2
(45) Date of Patent: Jul. 5, 2011

(54) APPARATUS AND METHOD FOR GENERATING CG IMAGE FOR 3-D DISPLAY

(75) Inventor: Isao Mihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 15 days.

(21) Appl. No.: 11/902,216

(22) Filed: Sep. 20, 2007

(65) Prior Publication Data

US 2008/0180443 A1     Jul. 31, 2008

(30) Foreign Application Priority Data

Jan. 30, 2007   (JP) ................................ P2007-019654

(51) Int. Cl.
*G06T 15/50*      (2006.01)

(52) U.S. Cl. ............. 345/426; 345/1.1; 345/6; 345/419; 345/420; 345/428; 382/285

(58) Field of Classification Search ........................ None
See application file for complete search history.

(56) References Cited

U.S. PATENT DOCUMENTS

| | | | |
|---|---|---|---|
| 6,020,890 A * | 2/2000 | Kohda ........................... | 345/419 |
| 6,222,551 B1 * | 4/2001 | Schneider et al. ............ | 345/419 |
| 6,268,880 B1 * | 7/2001 | Uomori et al. .................. | 348/47 |
| 6,683,608 B2 * | 1/2004 | Golin et al. .................... | 345/419 |
| 7,379,060 B2 * | 5/2008 | Kobayashi et al. ........... | 345/419 |

OTHER PUBLICATIONS

Lippmann, "Photography—Reversible prints, Integral photography," Comptes Rendus De L'Academie Des Sciences, Reports of the Academy of Sciences, vol. 146(9), pp. 446-451, (Mar. 2, 1908).

Saishu, et al., "53.3: Distortion Control in a One-Dimensional Integral Imaging Autostereoscopic Display System with Parallel Optical Beam Groups", SID 04 Digest, pp. 1-4, (2004).

* cited by examiner

*Primary Examiner* — Antonio A Caschera

(74) *Attorney, Agent, or Firm* — Finnegan, Henderson, Farabow, Garrett & Dunner, L.L.P.

(57) ABSTRACT

An apparatus generates, by introducing a concept called "virtual viewpoint model", a CG image for use with a 3-D display through single rendering operation from a single viewpoint without adoption of a process for performing CG rendering operation from a plurality of viewpoints as in the case of a related-art technique and iterating CG rendering while the viewpoint is being changed.

6 Claims, 14 Drawing Sheets

WHEN VIEWPOINTS ARE PARALLEL TO EACH OTHER

WHEN VIEWPOINTS MAKE REFERENCE TO SINGLE OBJECT

FIG. 4

| VIEWPOINT 24 | VIEWPOINT 12 | VIEWPOINT 16 | VIEWPOINT 20 |
| --- | --- | --- | --- |
| VIEWPOINT 8 | | | VIEWPOINT 4 |
| | | VIEWPOINT 0 | |
| VIEWPOINT 23 | VIEWPOINT 11 | VIEWPOINT 15 | VIEWPOINT 19 |
| VIEWPOINT 7 | | | VIEWPOINT 3 |
| VIEWPOINT 22 | VIEWPOINT 10 | VIEWPOINT 14 | VIEWPOINT 18 |
| VIEWPOINT 6 | | | VIEWPOINT 2 |
| VIEWPOINT 21 | VIEWPOINT 25 | VIEWPOINT 13 | VIEWPOINT 17 |
| VIEWPOINT 5 | VIEWPOINT 9 | | VIEWPOINT 1 |

VIEW VOLUME FOR MODEL ACHIEVED FROM VIEWPOINT N

VIEW VOLUME FOR MODEL ACHIEVED FROM VIEWPOINT M (≠ N)

VIEW VOLUME FOR MODEL ACHIEVED FROM VIEWPOINT M (≠ N) (MODEL IS TRANSFORMED SUCH THAT VIEWPOINT BECOMES IDENTICAL WITH COMMON VIEWPOINT)

VIEW VOLUME OF GROUP OF VIRTUAL MODELS ACHIEVED FROM COMMON VIEWPOINT

NORMAL TRANSFORMATION OF VIEW VOLUME

REQUIRED TRANSFORMATION OF VIEW VOLUME

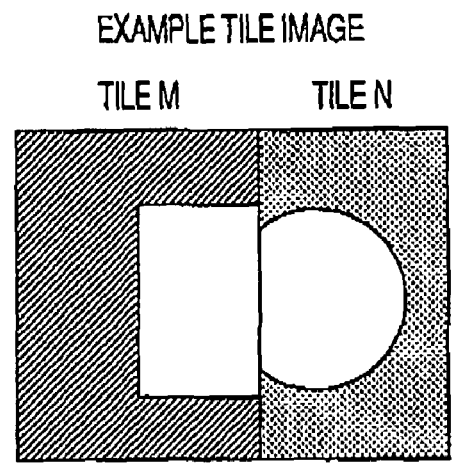
FIG. 17A  EXAMPLE TILE IMAGE
TILE M   TILE N
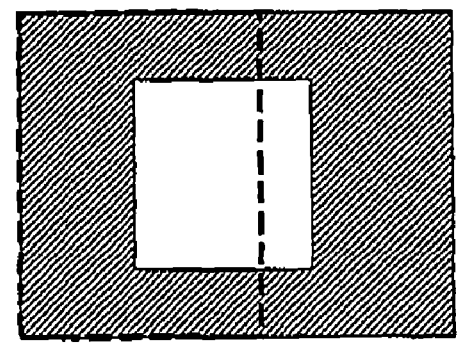
FIG. 17B  RELATIONSHIP BETWEEN RESULT OF RENDERING OF TILE M AND CG SPACE
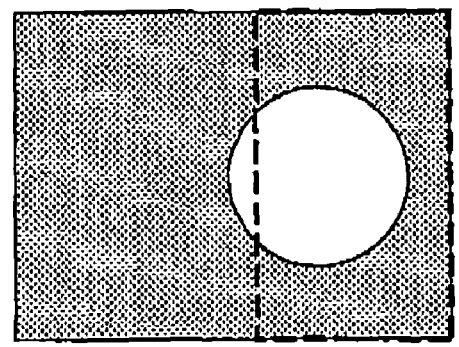
FIG. 17C  RELATIONSHIP BETWEEN RESULT OF RENDERING OF TILE N AND CG SPACE

APPARATUS AND METHOD FOR GENERATING CG IMAGE FOR 3-D DISPLAY

RELATED APPLICATION(S)

The present disclosure relates to the subject matter contained in Japanese Patent Application No. 2007-019654 filed on Jan. 30, 2007, which is incorporated herein by reference in its entirety.

FIELD

The present invention relates to an apparatus and method for generating a CG image for use with a three-dimensional display.

BACKGROUND

A binocular type and a multi-ocular type have hitherto been known as a method for displaying naked-eye three-dimensional image. In any of these types, a lenticular sheet, which is a semi-circular lens array having a lens characteristic in only a horizontal direction, or a parallax barrier is provided on a display surface, to thus cause right and left eyes to separately see a two-dimensional image having a parallax error and cause an observer to perceive a stereoscopic image, which is an image which enables perception of a three-dimensional appearance from only one direction. According to a method for displaying three-dimensional image of the binocular type, two two-dimensional images only cause an observer to perceive a three-dimensional image from one direction. However, according to a method for displaying a three-dimensional image of multi-ocular type, four two-dimensional images cause the observer to perceive a three-dimensional image from three directions, for example. Specifically, a motion parallax (a phenomenon by means of which an object appears to move in a direction opposite to a moving direction of a body), although discontinuous, is imparted to an observer.

An II (Integral Imaging) scheme is available as a scheme for rendering a motion parallax more perfect and enabling display of a "Three-dimensional Image (a stereoscopic image having motion parallax)." This scheme is derived from a technique for photographing and reproducing a stereoscopic image called an Integral Photography (IP) scheme proposed in 1908 (see, e.g., Related-art Document 1, which is identified later). This scheme includes: preparing a lens array corresponding to pixels of a steroscopic photograph; performing photography with a film placed at a focal length of the lens array; and placing the lens array used for photography on the photographed film, to thus effect reproduction. As is evident from a process for effecting reproduction by means of reversing only a traveling direction in information about a light beam recorded through a lens, this scheme is an ideal scheme for enabling reproduction of even a perfect aerial image without posing a restriction on the position of an observer as in the case of a holography, so long as the resolution of a film is sufficiently high. In an II-type three-dimensional image display device, a liquid-crystal display (LCD), which is a typical flat panel display, is used in place of a film. Light emitted from pixels passes through a lens, whereby a traveling direction of the light is limited and the light is emitted as a light beam. The greater the number of pixels provided at the rear of the lens; namely, the number of pieces of parallax information (i.e., pieces of image information which are viewed differently according to an angle of view), the wider a display range of the three-dimensional image display device toward the front or back thereof. However, when the resolution of the LCD is constant, a lens pitch becomes longer, so that the resolution of a three-dimensional image is deteriorated (see, e.g., Related-art Document 1).

Particularly, the II (1D-II) scheme for providing parallax information in only a horizontal direction utilizes a lenticular sheet as in the case of the three-dimensional image display method of multi-ocular type, and classification of the II scheme is likely to be confused. However, a characteristic of the II scheme lies in that the number of parallax errors is increased within a practicable range in consideration of a decrease in the resolution of a viewpoint image and that the position of an observer is not presumed at the time of designing of a light beam (i.e., a light collection point is not provided for each of the eyes at the time of observation). These characteristics conclusively differ from the design of the three-dimensional image display method of multi-ocular type that is characterized in that the number of parallax errors is reduced to a low value of 2 to 4 in order to prevent occurrence of a decrease in the resolution of a view point image and that light collection points are provided at positions corresponding to the eyes, to thus cause the eyes to perceive a stereoscopic image. Specifically, a horizontal lens pitch or an integral multiple thereof is designed to be an integral multiple of a horizontal pixel pitch, to thus cause beams exiting from a plurality of lenses to go out so as to become essentially parallel to each other. Thus, occurrence of, in a reproduction-observation space, a special point at which beams are concentrated is prevented (a method for setting light collection points sufficiently rearward of an observation distance is also available). In relation to these beams, though discretely light from a surface—which is acquired when a substance is actually present—is extracted and reproduced. Therefore, by means of increasing the number of parallax errors to a certain extent, the observer can visually ascertain, within an observation range, a binocular viewpoint image to be substantially viewed from the position of the observer, and consecutive parallax errors can be obtained. Through close examination, a difference between the II type and the multi-ocular type finally is determined to be a difference in arrangement of beams to be limited because the number of pixels of the flat panel typified by an LCD is finite. However, when compared with the three-dimensional image display method of multi-ocular type in which a motion parallax is incomplete as a result of an emphasis being placed on the resolution of a viewpoint image, the beam design of the 1D-II scheme that does not provide a special light collection point enables realization of a more natural three-dimensional image which lessens fatigue and takes into consideration a balance between a binocular parallax and a motion parallax (see, e.g., Related-art Document 2, which is identified later).

Thus, the 3-D display includes various schemes. Of these schemes, the II scheme is a superior 3-D display scheme that produces a more natural, fatigueless three-dimensional image.

However, the II scheme requires generation of a stereoscopic image by use of images captured when a target to be expressed stereoscopically is viewed from an extremely large number of viewpoints. Particularly, in the case of a CG image, a stereoscopic image must be generated by use of a plurality of images rendered from an extremely large number of viewpoints (see, e.g., Related-art Document 2).

In order to implement this processing operation through use of ordinary CG rendering operation, rendering operation must be repeatedly performed, from each of viewpoints, by an amount equal to the number of viewpoints.

An image format called a tile image format has already been conceived as a format for efficiently storing CG rendering images generated from a plurality of viewpoints. In order to convert a group of CG rendering images captured from a plurality of viewpoints into a tile image format, processing which is not presumed much in ordinary CG processing must be used frequently.

Related-art Document 1: M. G. Lippmann, Comptes Rendusde l'Académie des Sciences, Vol. 146, pp. 446 to 451 (1908).

Related-art Document 2: T. Saishu, et al., "Distortion Control in a One-Dimensional Integral Imaging Autostereoscopic Display System with Parallel Optical Beam Groups," SID 04 Digest, pp. 1438-1441, 2004.

As mentioned above, in order to produce a CG image for use with a 3-D display; especially a CD image for a II scheme, there are required (1) CG rendering operation from many viewpoints and (2) shaping of rendering images in a predetermined format (e.g., a tile image format for the case of the II scheme).

In relation to (1), in the case of, e.g., the II scheme, rendering from many viewpoints—ordinary 20 viewpoint or more—is usually required. Iteration of rendering operation involves consumption of a corresponding time, thereby posing a problem of a time to generate CG image becoming extremely long.

In relation to (2), a group of rendering images must be shaped in a predetermined format (e.g., a tile image). However, in order to perform shaping efficiently, rendering operation must be performed in the manner of usage which is not presumed much in ordinary CG. General-purpose graphics processing hardware (GPU: Graphics Processing Unit) is designed to exhibit extremely high performance within a presumed range. Therefore, when being used in excess of the presumed use method, the GPU fails to exhibit sufficient performance, which in turn raises a problem of deterioration of rendering speed.

In order to solve the problem, custom-designed graphics processing hardware—which is specialized for generating a CG image for use with a 3-D display and can exhibit best performance when used in such a way—must be developed. However, use of custom-designed hardware poses difficulty in providing inexpensive generation of a CG image for use with a 3-D display.

SUMMARY

One of objects of the present invention is to provide an apparatus and a method that enable simultaneous resolution of a related-art problem of a decrease in rendering speed and a related-art problem of difficulty in provision of inexpensive generation of a CG image for use with a 3-D display; and which enable inexpensive, high-speed generation of a CG image for use with a 3-D display.

According to a first aspect of the invention, there is provided an apparatus for generating computer graphics image for 3D, the apparatus including: a number computing unit that computes, based on three-dimensional display information, a number of pieces of virtual viewpoint models to be generated; a generation unit that generates, based on computer graphics model data, the virtual viewpoint models for the number of pieces computed by the virtual viewpoint model number computing unit; an arrangement information computing unit that computes, based on generation image information included in the three-dimensional display information, arrangement information to be used for arranging a group of the virtual viewpoint models within a computer graphics space; an arrangement unit that arranges, within the computer graphics space, data pertaining to the group of the virtual viewpoint models generated by the virtual viewpoint model generation unit in accordance with the arrangement information computed by the arrangement information computing unit; an information computing unit that computes virtual viewpoint information about each of the virtual viewpoint models, based on information regarding a light source and viewpoints to be generated as a computer graphics image and the three-dimensional display information; an information application unit that applies the virtual viewpoint information computed by the virtual viewpoint information computing unit to each of the corresponding virtual viewpoint models included in the group of the virtual viewpoint models computed by the virtual viewpoint model computing unit; an area information computing unit that computes a rendering area for each of the virtual viewpoint models based on the three-dimensional display information; and a rendering unit that renders the computer graphics image based on computer graphics space information, which includes the virtual viewpoint information about each of the virtual viewpoint models, and virtual viewpoint model group information, which includes the information regarding the light source and the viewpoints to be generated as the computer graphics image, acquired from the virtual viewpoint information application unit and on the rendering area computed by the virtual viewpoint model area information computing unit.

According to a second aspect of the invention, there is provided an apparatus for generating computer graphics image for 3D, the apparatus including: a number computing unit that computes, based on three-dimensional display information, a number of pieces of virtual viewpoint models to be generated; a generation unit that generates, based on computer graphics model data, the virtual viewpoint models for the number of pieces computed by the virtual viewpoint model number computing unit; an arrangement information computing unit that computes, based on generation image information included in the three-dimensional display information, arrangement information to be used for arranging a group of the virtual viewpoint models within a computer graphics space; an arrangement unit that arranges, within the computer graphics space, data pertaining to the group of the virtual viewpoint models generated by the virtual viewpoint model generation unit in accordance with the arrangement information computed by the arrangement information computing unit; an area information computing unit that computes, based on the three-dimensional display information, a rendering area for each of the virtual viewpoint models; a deformation unit that performs a geometry deformation on a geometry of the virtual viewpoint models arranged by the virtual viewpoint model arrangement unit, based on the rendering area for each of the virtual viewpoint models being computed by the virtual viewpoint model area information computing unit; an information computing unit that computes virtual viewpoint information about each of the virtual viewpoint models, based on information regarding a light source and viewpoints to be generated as a computer graphics image and the three-dimensional display information; an application unit that applies the virtual viewpoint information computed by the virtual viewpoint information computing unit to each of the corresponding virtual viewpoint models included in the group of the virtual viewpoint models acquired from the virtual viewpoint model deformation unit; and a rendering unit that renders the computer graphics image based on computer graphics space information, which includes the virtual viewpoint information about each of the virtual viewpoint models, and virtual viewpoint model group information, which includes the information regarding the light source and the viewpoints to be generated as the computer graphics image, acquired from the virtual viewpoint information application unit.

According to a third aspect of the invention, there is provided a method for generating computer graphics image for 3D, the method including: computing, based on three-dimensional display information, a number of pieces of virtual viewpoint models to be generated; generating, based on computer graphics model data, the virtual viewpoint models for the computed number of pieces; computing, based on generation image information included in the three-dimensional display information, arrangement information to be used for arranging a group of the virtual viewpoint models within a computer graphics space; arranging, within the computer graphics space, data pertaining to the group of the virtual viewpoint models in accordance with the arrangement information; computing virtual viewpoint information about each of the virtual viewpoint models, based on information regarding a light source and viewpoints to be generated as a computer graphics image and the three-dimensional display information; applying the virtual viewpoint information to each of the corresponding virtual viewpoint models included in the group of the computed virtual viewpoint models; computing a rendering area for each of the virtual viewpoint models based on the three-dimensional display information; and rendering the computer graphics image based on computer graphics space information, virtual viewpoint model group information, and the rendering area.

According to a fourth aspect of the invention, there is provided a method for generating computer graphics image for 3D, the method including: computing, based on three-dimensional display information, a number of pieces of virtual viewpoint models to be generated; generating, based on computer graphics model data, the virtual viewpoint models for the computed number of pieces; computing, based on generation image information included in the three-dimensional display information, arrangement information to be used for arranging a group of the virtual viewpoint models within a computer graphics space; arranging, within the computer graphics space, data pertaining to the group of the virtual viewpoint models in accordance with the arrangement information; computing, based on the three-dimensional display information, a rendering area for each of the virtual viewpoint models; performing a geometry deformation on a geometry of the arranged virtual viewpoint models, based on the rendering area for each of the virtual viewpoint models; computing virtual viewpoint information about each of the virtual viewpoint models, based on information, regarding a light source and viewpoints to be generated as a computer graphics image and the three-dimensional display information; applying the virtual viewpoint information to each of the corresponding virtual viewpoint models included in the group of the virtual viewpoint models; and rendering the computer graphics image based on computer graphics space information and virtual viewpoint model group information.

According to a fifth aspect of the invention, there is provided a computer readable program product for causing a computer system to execute a procedure for generating computer graphics image for 3D, the procedure including: computing, based on three-dimensional display information, a number of pieces of virtual viewpoint models to be generated; generating, based on computer graphics model data, the virtual viewpoint models for the computed number of pieces; computing, based on generation image information included in the three-dimensional display information, arrangement information to be used for arranging a group of the virtual viewpoint models within a computer graphics space; arranging, within the computer graphics space, data pertaining to the group of the virtual viewpoint models in accordance with the arrangement information; computing virtual viewpoint information about each of the virtual viewpoint models, based on information regarding a light source and viewpoints to be generated as a computer graphics image and the three-dimensional display information; applying the virtual viewpoint information to each of the corresponding virtual viewpoint models included in the group of the computed virtual viewpoint models; computing a rendering area for each of the virtual viewpoint models based on the three-dimensional display information; and rendering the computer graphics image based on computer graphics space information, virtual viewpoint model group information, and the rendering area.

According to a sixth aspect of the invention, there is provided a computer readable program product for causing a computer system to execute a procedure for generating computer graphics image for 3D, the procedure including: computing, based on three-dimensional display information, a number of pieces of virtual viewpoint models to be generated; generating, based on computer graphics model data, the virtual viewpoint models for the computed number of pieces; computing, based on generation image information included in the three-dimensional display information, arrangement information to be used for arranging a group of the virtual viewpoint models within a computer graphics space; arranging, within the computer graphics space, data pertaining to the group of the virtual viewpoint models in accordance with the arrangement information; computing, based on the three-dimensional display information, a rendering area for each of the virtual viewpoint models; performing a geometry deformation on a geometry of the arranged virtual viewpoint models, based on the rendering area for each of the virtual viewpoint models; computing virtual viewpoint information about each of the virtual viewpoint models, based on information regarding a light source and viewpoints to be generated as a computer graphics image, and the three-dimensional display information; applying the virtual viewpoint information to each of the corresponding virtual viewpoint models included in the group of the virtual viewpoint models; and rendering the computer graphics image based on computer graphics space, information and virtual viewpoint model group information.

BRIEF DESCRIPTION OF THE DRAWINGS

In the accompanying drawings:

FIG. 4 is a view for describing a tile image;

FIGS. 17A-17C are views for describing a tile image which uses results of rendering of partial areas;

DETAILED DESCRIPTION OF THE EMBODIMENTS

Referring now to the accompanying drawings, an embodiment of the present invention will be described in detail.

Figure 1:
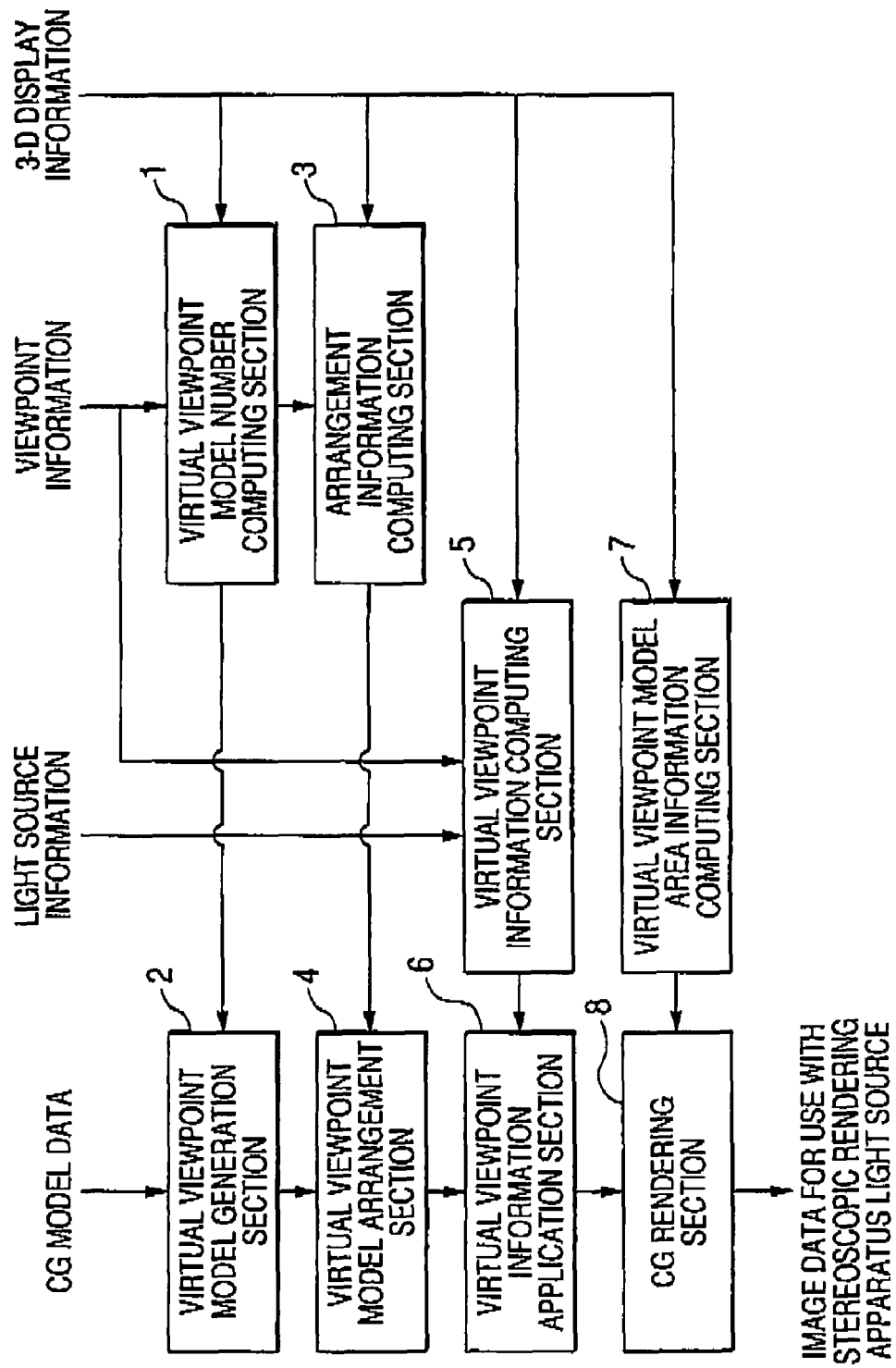
FIG. 1 is a view schematically showing an example configuration of an apparatus for generating a CG image for use with a 3-D display according to an embodiment of the present invention.

FIG. 1 is a block diagram showing an apparatus for generating a CG image for use with a 3-D display according to an embodiment of the present invention.

The apparatus of the embodiment for generating a CG image for use with a 3-D display includes: a virtual viewpoint model number computing section 1 that computes a number of virtual viewpoint models from 3-D display information; a virtual viewpoint model generation section 2 that generates, from CG model data which are to serve as an input, virtual viewpoint models in number equal to the number of models computed in the virtual viewpoint model number computing section 1; an arrangement information computing section 3 that computes, from information about an image to be produced included in 3-D display information, information used for arranging a group of virtual viewpoint models within a CG space; a virtual viewpoint model arrangement section 4 that arranges, within a CG processing space, data pertaining to the group of virtual viewpoint models acquired by the virtual viewpoint model generation section 2 in accordance with the information computed by the arrangement information computing section 3; a virtual viewpoint information computing section 5 that computes viewpoint-and-light-source parameters of the respective virtual viewpoint models by use of information about the viewpoints and the light source to be generated as a CG image and the 3-D display information; a virtual viewpoint information application section 6 that applies corresponding virtual viewpoint information computed by the virtual viewpoint information computing section 5 to each of the models included in the group of models acquired from the virtual viewpoint model arrangement section 4; a virtual viewpoint model area information computing section 7 that computes, from the 3-D display information, a rendering area for each of the virtual viewpoint models; and a CG rendering section 8 that performs CG rendering operation by use of the CG space information acquired from the virtual viewpoint information application section 6, virtual viewpoint model group information, and the information about areas—where respective models are rendered—acquired from the virtual viewpoint model area information computing section 7.

Figure 3A:
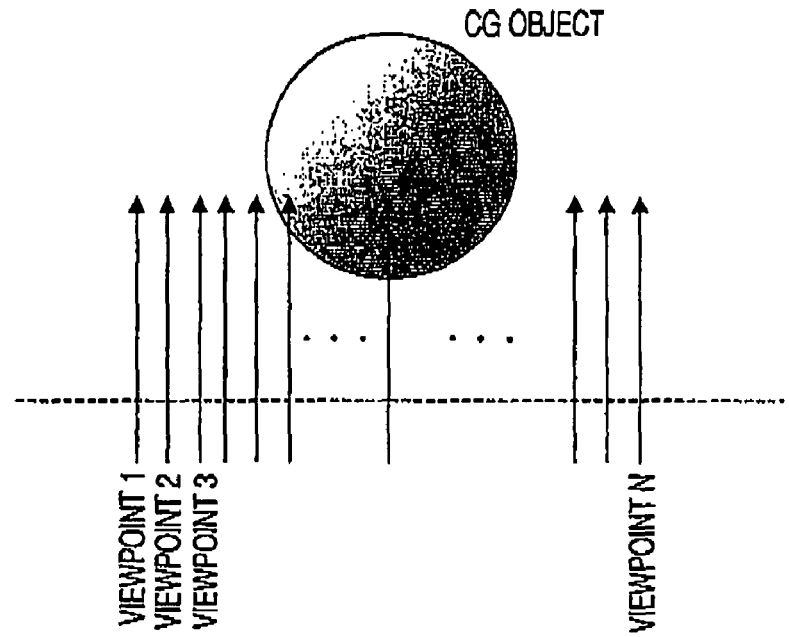
FIGS. 3A and 3B are views for describing different viewpoints.
Figure 3B:
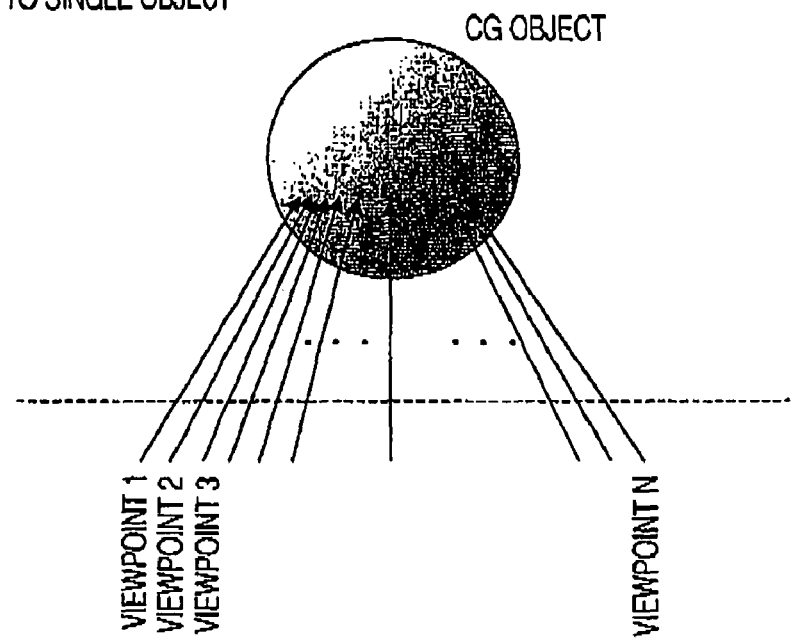

In contrast with an ordinary CG image, a CG image for use with a 3-D display enables stereoscopic display of a generated image by use of a plurality of CG images generated from different viewpoints, as shown in FIGS. 3A and 3B. The reason for this is that the 3-D display generates a stereoscopic image by use of information about parallax errors appearing in the CG images generated from different viewpoints.

For the sake of simple explanation, descriptions are provided hereunder by means of taking a 3-D display of integral imaging scheme (hereinafter called an "II scheme") as an example. However, the present invention is not limited to the II scheme. The same shall apply to another scheme, such as a binocular scheme, a multi-ocular scheme, and the like. Details about the II scheme are described in the Related-art Document 1 and the Related-art Document 2, and therefore, detailed description about the II scheme is omitted herein.

In the 3-D display of II scheme, a group of CG images generated from different viewpoints are managed as a single image by use of an original image format, such as that described in connection with Related-art Document 1. The group of CG images generated at the respective viewpoints are arranged in a tile pattern, merged together, and managed as a single image. Therefore, the image is hereunder called a "tile image." FIG. 4 schematically shows an example tile image generated from CG images captured from 26 viewpoints. As shown in FIG. 4, an image captured through CG rendering performed at each viewpoint (viewpoint number N=0, . . . , 25) is stored in each predetermined area within one image. An area assigned to each viewpoint is called a "tile," and an image stored in each tile is hereinafter called a "viewpoint image."

As mentioned above, a CG image for use with a 3-D display is characterized as being generated in the form of a combination of a plurality of viewpoint images.

For the sake of convenience, descriptions are provided by means of taking the tile image as an example. However, specifics of the embodiment of the present invention are not limited to this arrangement. The present invention can be practiced, as required, in conformance with a format for a 3-D display to which the present invention is desired to be applied.

As described above, a collection of viewpoint images; for example, a tile image for the case of the II scheme, is required to generate a CG image for use with a 3-D display.

Figure 2:
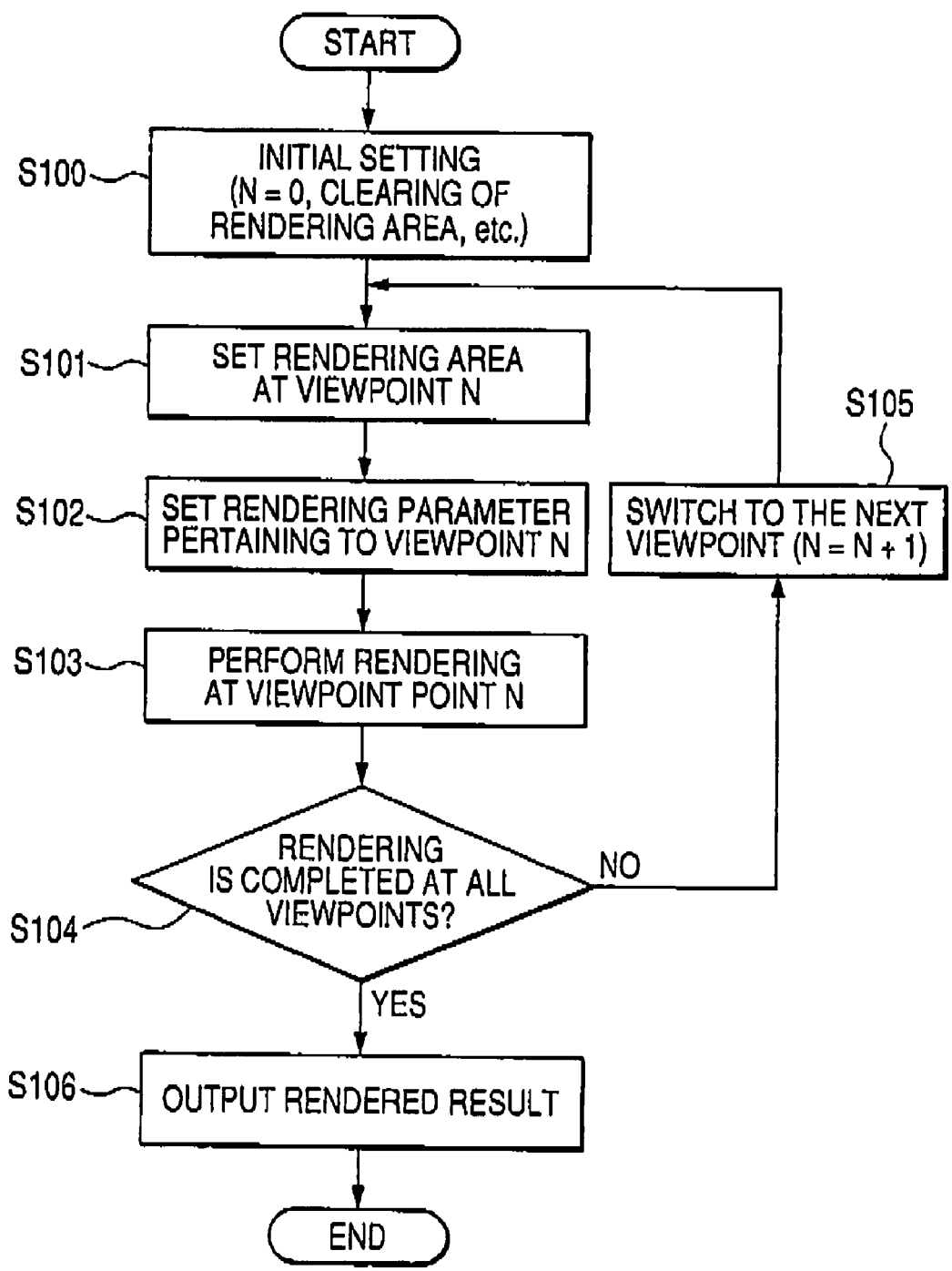
FIG. 2 is a view for describing the flow of processing of a related-art technique.

FIG. 2 shows the flow of processing for generating a CG image for use with a 3-D display according to a related-art technique. General flow of processing is described by reference to FIG. 2. First, initial settings, such as the position of a viewpoint where rendering is desired to be performed and a rendering area, are made (step S100). Next, an area desired to be rendered at the position of the viewpoint where rendering is desired to be performed (viewpoint N) is set (step S101). Rendering parameters pertaining to the viewpoint N are set (step S102). Next, rendering is performed at the viewpoint N (step S103). In step S104, a determination is made as to whether or not processing pertaining to all of the viewpoints has been completed. When processing is not yet completed, processing proceeds to step S105. When processing has already been completed, processing proceeds to step S106. In step S105, the viewpoint of the target of rendering is changed to the next viewpoint, and processing returns to step S101. In step S106, a rendered image is output to a screen or a file, and processing is completed.

As mentioned above, according to the related-art technique, CG rendering operation (step S103) is repeated on a per-viewpoint-basis. In accordance with a predetermined format (e.g., a tile image format), a required CG image (a tile image) for use with a 3-D display is finally generated.

Specifically, according to the related-art scheme for generating a CG image for use with a 3-D display, processing for iterating ordinary CG rendering operation in equal number to viewpoints is indispensable.

However, as mentioned previously, processing for iterating CG rendering operation is processing of very low efficiency for existing CG rendering hardware (hereinafter called a GPU: Graphics Processing Unit). In order to accelerate CG rendering operation, a GPU is currently used in most of CG rendering operation. In order to speed up generation of a CG for a 3-D display, use of a GPU or equivalent custom-designed hardware is imperative. However, the GPU is designed so as to be able to exhibit performance on the assumption that the GPU is used for ordinary CG rendering. Therefore, the GPU cannot exhibit best performance at the time of generation of a tile image, such as that mentioned previously. Specifically, according to the related-art scheme, difficulty is encountered in generating a CG image (a tile image) for a 3-D display at high speed.

The objective of the embodiment is to obviate processing (iterative processing pertaining to steps S101 to S104) for iterating CG rendering operation, such as that shown in FIG. 2, and to generate an image corresponding to a tile image by means of only single rendering operation with use of one camera as in the case of ordinary CG rendering operation. Thereby, realization of ordinary processing presumed for a GPU and enabling of CG rendering involving exhibition of best performance of a GPU are sought. Consequently, generation of a CG image (a tile image) for use with a 3-D display at extremely high speed is expected.

As described previously, the objective of the embodiment is to generate a CG image for use with a 3-D display through single rendering operation from a single viewpoint without adoption of a process for performing CG rendering operation from a plurality of viewpoints as in the case of a related-art technique and iterating CG rendering while the viewpoint is being changed. To this end, a concept of "virtual viewpoint model" is introduced.

A CG image for use with a 3-D display is, for example, a tile image shown in FIG. 4. CG images (CG images stored in each tile image)—which are included in the tile image and have been acquired from respective viewpoints—are acquired by means of rendering single set of 3-D model data (a CG object) from different viewpoints (viewpoint number N=0, ... 25). Put another way, a tile image, such as that shown in FIG. 4, is produced from an originally-single set of 3-D model data. In this case, a rendering area of the 3-D model falls within each tile, and rendering operation is closed within each tile. In the case of the tile image shown in FIG. 4, from the viewpoint of an entire tile image, rendering results of 26 models acquired from a single set of 3-D model data are observed.

When the entire tile image is viewed as a single rendering area, it appears as if 26 3-D models were present within the tile image.

In the embodiment of the present invention, each of the 3-D models is called a virtual viewpoint model. Originally, 3-D model data are individually rendered in each of tiles and arranged in a tile pattern. However, the data look as if a plurality of sets of 3-D model data were rendered on a single screen.

In the embodiment, a tile image is considered to be a single CG space, and a virtual viewpoint model is generated and arranged in an area corresponding to each of tiles in the tile image. A tile image can be generated by means of performing rendering operation only once from a single viewpoint.

Individual sections will be described in detail hereunder by reference to FIG. 1.

The virtual viewpoint model number computing section 1 will first be described.

The virtual viewpoint model number computing section 1 is for computing the number of virtual viewpoint models from viewpoint information and 3-D display information.

In ordinary cases, in connection with computer graphics, when a viewpoint and a light source are determined, rendering of a CG model can be performed. The same also applies to 3-D display rendering, and viewpoint information and a light source are first input.

Here, the term "viewpoint information" is used as information including a viewpoint (a camera) set at the time of rendering of certain CG model data. Camera parameters, such as a visual range up to the CG model data, an angle of view, and the like, employed at the time of observation of a CG model from a viewpoint correspond to the viewpoint information.

When rendering is performed from multiple viewpoints for 3-D display purpose, information about other viewpoints (right and left viewpoints) is generated from 3-D display information and used while the viewpoint information is taken as, e.g., information about the center point (in the case of the embodiment, this information is computed as virtual viewpoint information by the virtual viewpoint computing section to be described later. More details are described later).

The 3-D display information includes the number of parallax errors of a 3-D image (a stereoscopic image) desired to be generated, the amount of depth desired to be expressed on a 3-D display in connection with the stereoscopic image, information about a panel of the 3-D display (in the case of a 3-D display using a lenticular lens, information about a lens pitch of the lenticular lens and the radius of curvature of the lens, information about pixels on a corresponding panel, and the like), and the like.

The number of viewpoints from which rendering must be actually performed as the 3-D display (i.e., the number of tiles of a tile image) can be computed from the viewpoint information and the 3-D display information. The number of viewpoints is none other than the above-described number of virtual viewpoint models.

The virtual viewpoint model number computing section 1 is for computing the number of virtual viewpoint models from such viewpoint information and the 3-D display information. In the 3-D display of II scheme, a technique for controlling a view area is added in order to enhance the image quality of a 3-D image (a stereoscopic image) to be displayed, and hence the number of parallax errors does not inevitably coincide with the number of virtual viewpoint models (see, for more details, Related-art Document 2). Normally, virtual viewpoint models which are greater in number than parallax errors are obtained.

Hereinafter, descriptions are continued through use of an example where the number of viewpoints is computed to be 16 and the number of virtual viewpoint models is computed to be 26 (this example is intended solely for description purpose, and the number of virtual viewpoint models is not limited to 26).

Next, the virtual viewpoint model generation section 2 will be described.

The virtual viewpoint model generation section 2 is for generating, from CG model data which is to serve as an input, virtual viewpoint models in equal number to the models computed by the virtual viewpoint model number computing section 1.

Specifically, in the case where the number of virtual viewpoint models is 26, 26 CG models (3-D models) are replicated. In many cases, the CG model data are realized as an aggregate of sets of polygon data. The polygon data are replicated, to thus cause 26 polygon models to be present. For example, in the field of computer graphics, polygon data are frequently managed by use of a memory area called a vertex buffer. The vertex buffer is copied, to thus create 26 vertex buffers. In order to enable distinction of the virtual viewpoint models from each other, information for enabling distinction of sets of virtual viewpoint model data at respective virtual viewpoints is added to each of the vertex buffers, such as a virtual viewpoint ID (=0, . . . , 26) which is managed while being included in vertex information.

Implementation of the polygon model is described herein as an example, however any other models may be implemented.

The term "replication" used herein does not signify only generation of new data through actual copying of data. A pointer used for making a reference to actual data may also be generated in the number of 26, to thus enable a reference as if there were 26 sets of data despite only a single set of data. Alternatively, there can also be adopted a management method under which only a plurality of index buffers are provided despite a single set of actual data, by use of a technique called an index buffer for indexing each of sets of vertex data included in polygon data and making a reference by use of an index. Further, similar management can also be performed by use of a function called a geometric instance. Specifically, the essential requirement is to generate models by use of a technique for enabling models to be regarded to be present in equal number to virtual viewpoint models, and no limitations are imposed on the technique.

The arrangement information computing section 3 will now be described.

The arrangement information computing section 3 is for computing information used for arranging a group of virtual viewpoint models acquired by the virtual viewpoint model generation section 2 within a CG space, from information about an image to be generated included in the 3-D display information.

Specifically, in the case of the II scheme, an image to be generated is managed by use of, e.g., a tile image format, such as that shown in FIG. 4. Information, such as a position where a virtual viewpoint model is to be arranged according to the position of each tile, is computed by use of the format information.

Operation of the arrangement information computing section 3 is described hereunder by reference to the drawings. Deformed drawings are used hereunder in order to make descriptions provided below easy to understand, and hence the drawings are not always accurate expressions.

Figure 5:
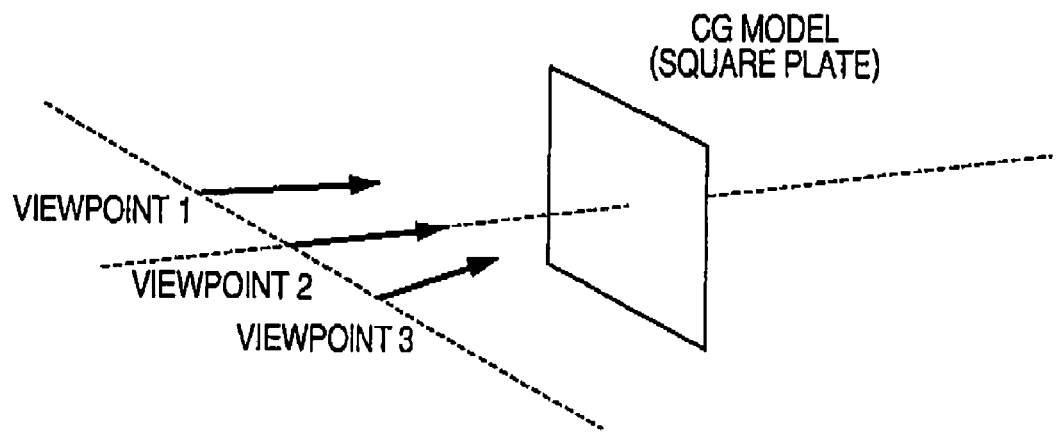
FIG. 5 is a view for describing situations where a CG model is viewed from a plurality of viewpoints.
Figure 6:
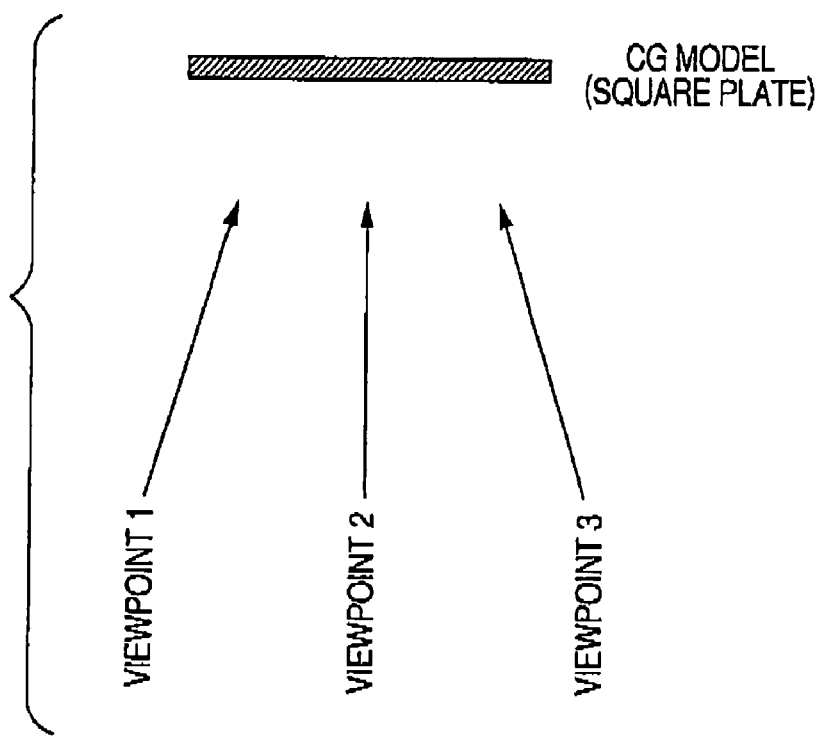
FIG. 6 is a view for describing situations where a CG model is viewed from a plurality of viewpoints.

Now, consideration is given to the case where the number of viewpoints (=the number of virtual viewpoint models) is three, in order to simply descriptions. Consideration is given to a circumstance where CG achieved when a "square plate" is viewed from front is rendered as a CG model from respective viewpoints. FIG. 5 is a view which schematically shows the manner of CG rendering. (FIG. 6 is a diagrammatic view showing the manner of rendering of computer graphics when viewed from above).

Figure 7A:
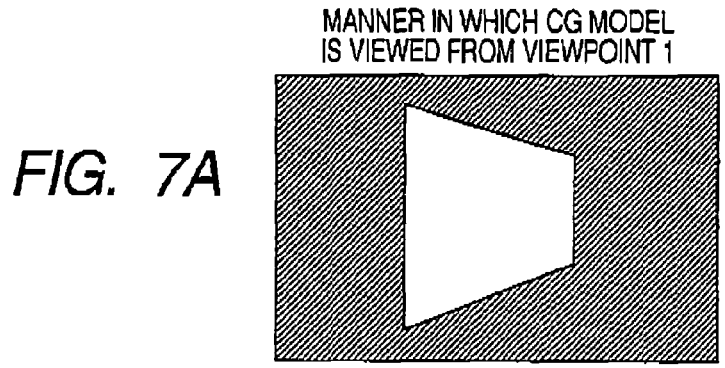
FIGS. 7A-7C are views for describing the manner in which the CG model is viewed from each of the viewpoints.
Figure 7B:
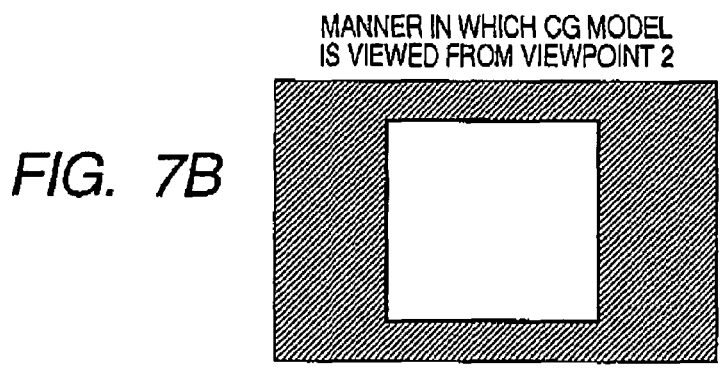
Figure 7C:
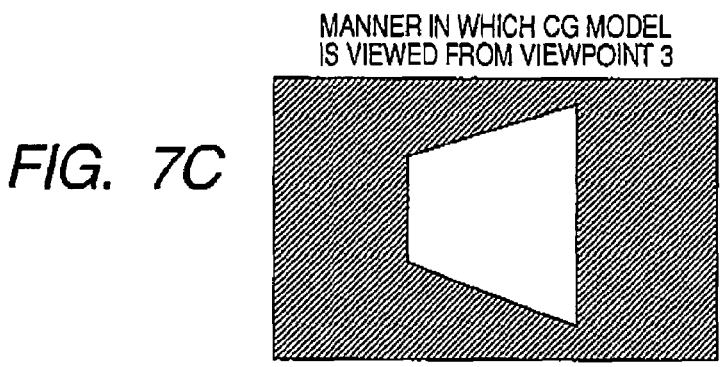

At this time, the manner in which a CG model is viewed from each of viewpoints (viewpoints 1, 2, and 3) is as shown in FIGS. 7A, 7B, and 7C. From the viewpoint 1, a side of the CG model close to the viewpoint looks greater because a distance to the side is short, whereas a side of the same distant from the viewpoint looks smaller because a distance to the side is long. At the viewpoint 2, the CG model is located immediately opposite the viewpoint. Hence, the CG model looks a square. From the viewpoint 3, appearance of the sides of the CG model is the reverse of that acquired from the viewpoint 1.

Figure 8:
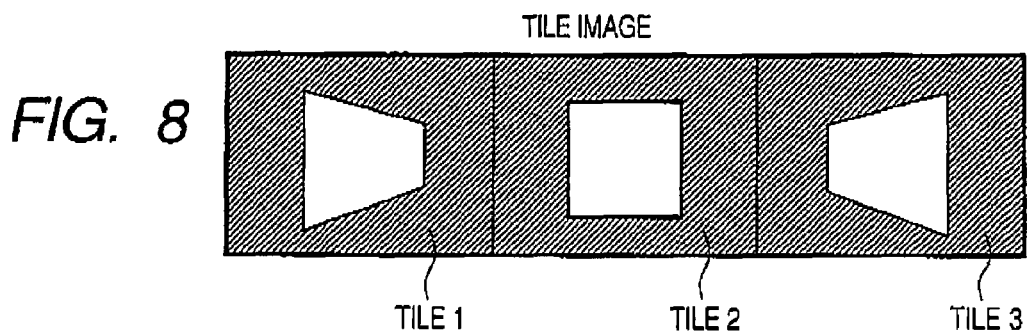
FIG. 8 is a view for describing example tile images.

In this case, a tile image is generated as a format, such as that shown in FIG. 8. As shown in FIG. 5, according to a related-art technique, one CG model is viewed from three viewpoints (the viewpoints 1 through 3), and rendering is performed at each of the viewpoints, thereby shaping rendering results as a format, such as that shown in FIG. 8. The essential requirement is to finally acquire such images. Therefore, as shown in FIGS. 9 and 10, even when three virtual viewpoints are considered and when three virtual viewpoint models are arranged respectively in front of these virtual viewpoints, to thus render only predetermined ranges, images analogous to those shown in FIG. 8 can be generated.

Figure 11:
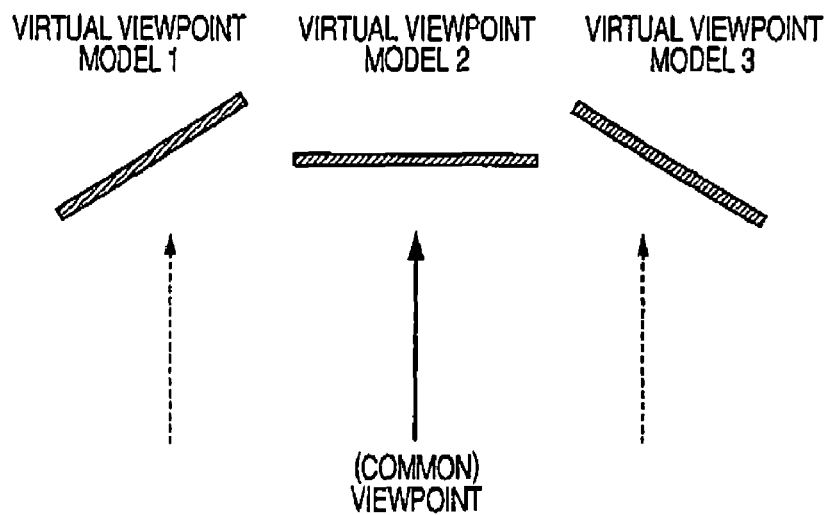
FIG. 11 is a view for describing circumstances where the virtual viewpoint models are viewed from a common viewpoint model.

Moreover, as shown in FIG. 11, even when rendering is performed only once while the virtual viewpoints 1 through 3 are taken as a single viewpoint without posing limitations on a rendering area, images similar to those shown in FIG. 8 can be generated. In the case of CG rendering, a camera involving projective transformation (a camera having a coordinate system for effecting projective transformation when a view volume area serving as an area of apparent trapezoid is converted into a screen coordinate system) is used. However, in this case, when rendering is performed through use of these camera parameters, a correct result cannot be acquired. A method for resolving this problem will be described in detail at the time of description of the virtual viewpoint information computing section 5. Hence, as of now, it is assumed that images similar to those shown in FIG. 8 can be generated by means of rendering a CG space including the virtual models 1 to 3, such as those shown in FIG. 11, from a single viewpoint.

As mentioned above, virtual viewpoint models in equal number to the viewpoints (=the number of virtual viewpoint models) are arranged at predetermined positions in a single CG space, and rendering is performed once by use of a single viewpoint, so that a CG image equivalent to a tile image can be generated.

Figure 9:
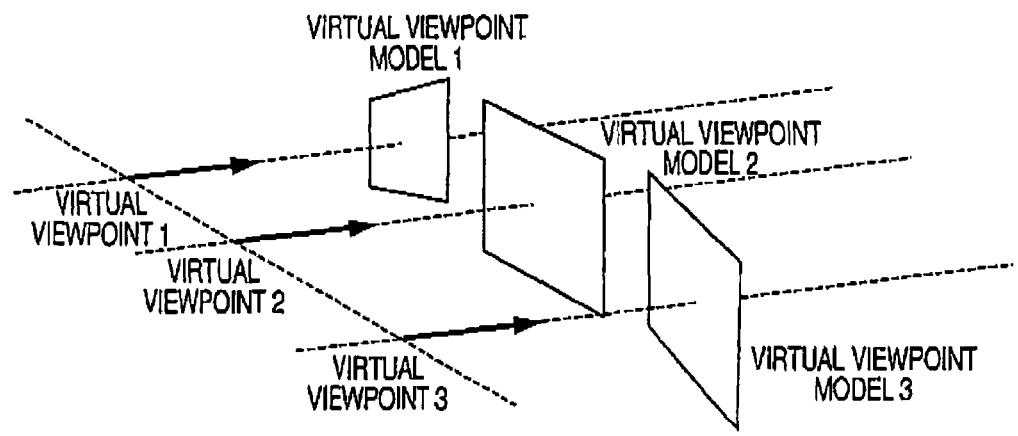
FIG. 9 is a view for describing virtual viewpoint models.
Figure 10:
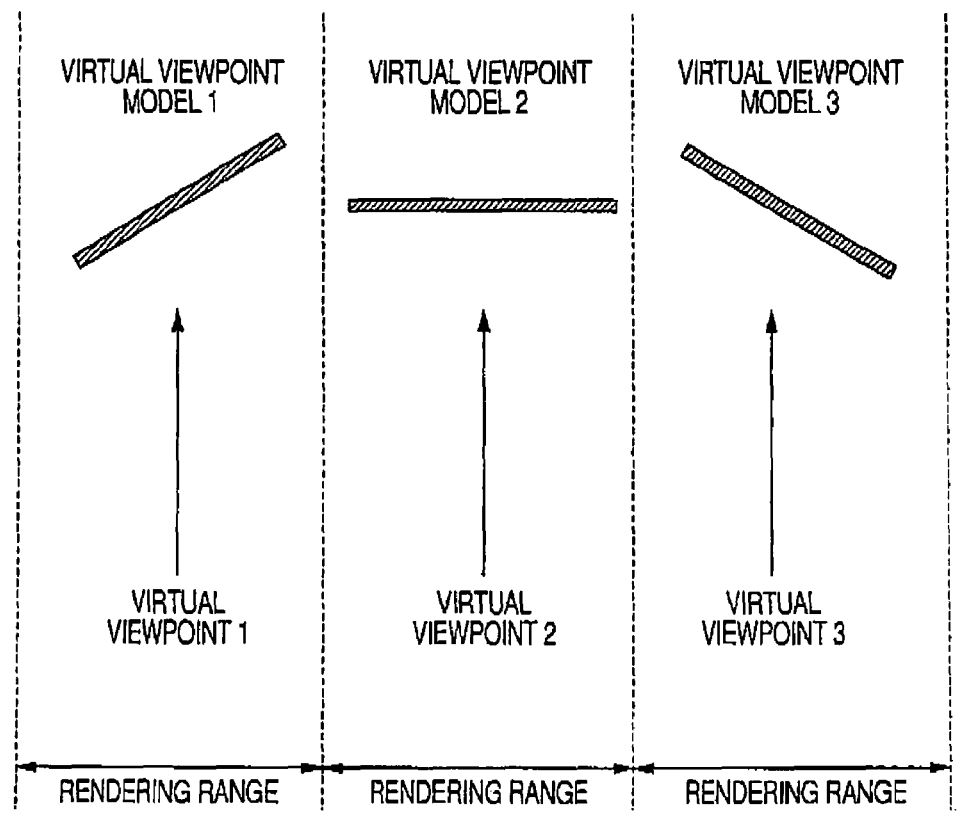
FIG. 10 is a view for describing virtual viewpoint models.
Figure 12:
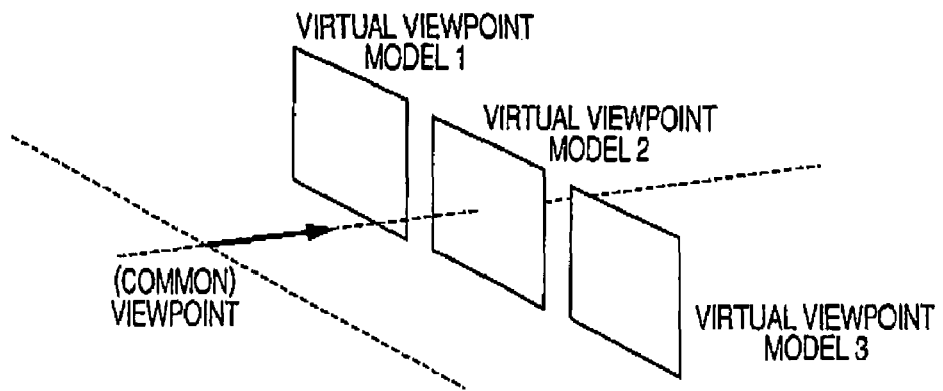
FIG. 12 is a view for describing the arrangement of virtual viewpoint models.
Figure 13:
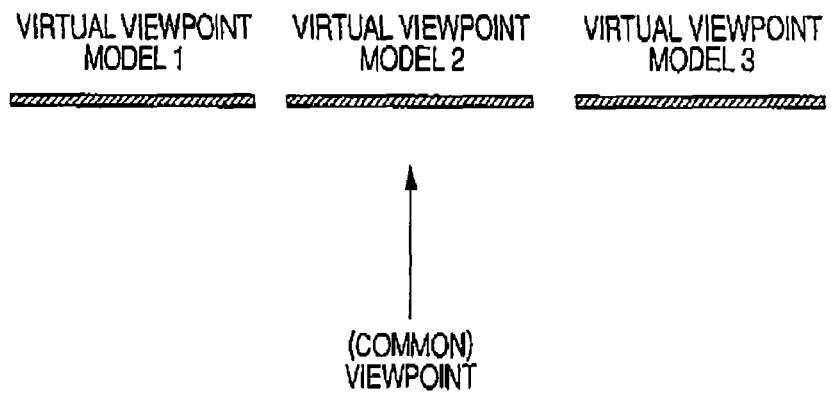
FIG. 13 is a view for describing the arrangement of the virtual viewpoint models.

As shown in FIGS. 9 and 10, the respective virtual viewpoint models must be viewed from the viewpoints in the same manner as shown in FIG. 8. Therefore, geometric conversion (or a change in posture or the like) and transformation must be added to each of the virtual viewpoint models (the virtual viewpoint models 1 and 3 are subjected to posture conversion in FIG. 10 for this reason). However, transformation will be described in detail later in conjunction with description of the virtual viewpoint information computing section 5, and hence an explanation about transformation is omitted as of now. In the arrangement information computing section 3, consideration is given solely to the arrangement of virtual viewpoint models. Hence, positional information used for arranging all of virtual viewpoint models is computed so as to conform to the format of the tile image. FIGS. 12 and 13 show a case where consideration is given solely to a arrangement without taking account for conversion or transformation. Thus, the virtual viewpoint models generated by the virtual viewpoint model generation section 2 must be placed at positions conforming to the format of the tile image, and hence the arrangement information computing section 3 computes information about these positions.

A local coordinate system used for effecting rendering in connection with each of tiles is obtained from information about the format of a tile image acquired from the 3-D display information. This local coordinate system is called a tile coordinate system. A transformation expression (or a transformation matrix)—which transforms the tile coordinate system into a global coordinate system when a tile image is considered to be a single CG space—can be computed by use of information about the format of a tile image. Information about a coordinate position—where a virtual viewpoint model is to be arranged—is computed by use of this information and a coordinate value in a model coordinate system of a CG model. Information about a coordinate position to be computed may also be offset values of respective coordinates for transformation or a transformation matrix. Alternatively, the information may also be a transformation expression.

The above descriptions provide an example of computation, and the computing technique is not limited to the example.

The virtual viewpoint model arrangement section 4 will now be described.

The virtual viewpoint model arrangement section 4 is for arranging, in a CG processing space, data pertaining to a group of virtual viewpoint models acquired by the virtual viewpoint model generation section 2, in accordance with the information computed by the arrangement information computing section 3.

As described above, the arrangement information computing section 3 arranges the virtual viewpoint model data generated by the virtual viewpoint model generation section 2 in one CG space. Specifically, the situations shown in FIGS. 12 and 13 are actually created.

Specifically, the arrangement information computed by the arrangement information computing section 3 is applied to a virtual viewpoint model, thereby properly arranging respective virtual viewpoint models in the CG space. The arrangement information is expressed as an offset value for transformation, a transformation matrix, a transformation expression, or equivalent information, and the information is applied to each of the virtual viewpoint models. The virtual viewpoint models are distinguished from each other by use of the ID information added by the virtual viewpoint model generation section 2. An application method may also comprise actually changing coordinate values included in data pertaining to a virtual viewpoint model; or attaching a transformation matrix or a transformation expression to data and performing arrangement through computation performed during actual rendering operation (transformation operation in vertex processing performed during rendering, or like operation). So long as situations—where the position of a virtual viewpoint model can be correctly computed at the time of actual rendering of computer graphics—can have been created, the virtual viewpoint model arrangement section 4 can be used without posing any limitations on the technique.

The virtual viewpoint information computing section 5 will now be described.

The virtual viewpoint information computing section 5 is for previously computing information about vertex processing operation (transformation operation, lighting operation, or the like) to be applied to each of virtual viewpoint models. In processing computer graphics, a model is first subjected to vertex processing, and a result of processing undergoes raster transformation. The result further undergoes pixel processing, whereby rendering is completed. Specifically, rendering requires information for use in vertex processing. Information for use in vertex processing is computed in connection with each of the virtual viewpoint models. More specifically, the virtual viewpoint information computing section 5 computes a viewpoint parameters and a light source parameter, both pertaining to each of virtual viewpoint models, a transformation expression (or a transformation matrix), a deformation expression (or a deformation matrix), and the like, through use of viewpoint information and a light source, which are to be generated as a CG image, and 3-D display information.

As mentioned above, a rendering result equivalent to a tile image cannot be acquired by means of only arranging the group of virtual viewpoint models generated by the virtual viewpoint model generation section 2 through use of the virtual viewpoint model arrangement section 4. This corresponds to the difference between the result shown in FIG. 9 and the result shown in FIG. 12. Specifically, the group of virtual viewpoint models must be transformed such that a result becomes equivalent to that acquired when a model is viewed from each of viewpoints as shown in FIG. 8. Various pieces of information required at this time are computed.

Figure 14:
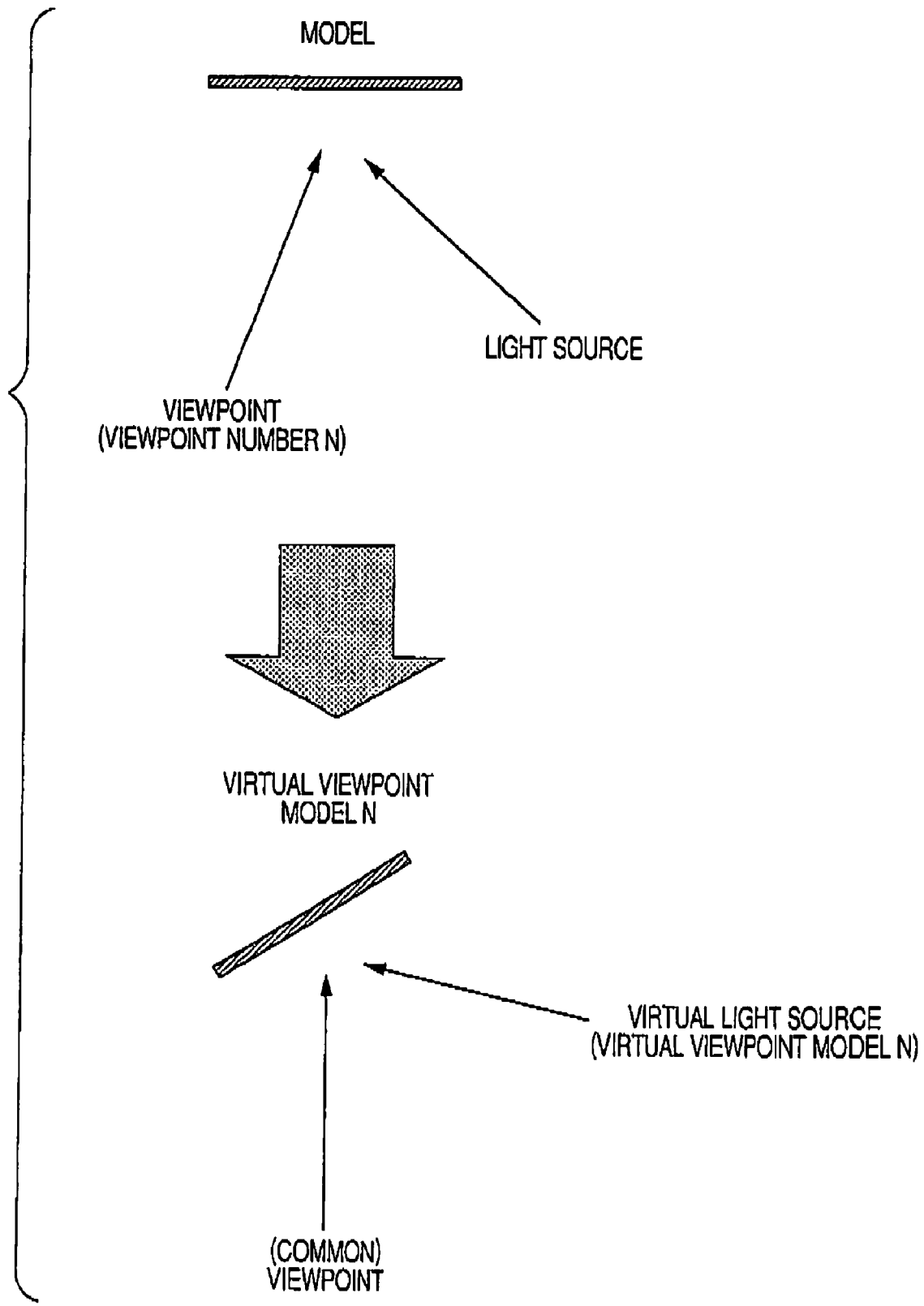
FIG. 14 is a view for describing a virtual viewpoint model and conversion/transformation of a virtual light source.

Specifically, during rendering performed in connection with each of tiles, a CG model whose geometry data remain unchanged in relation to each of tiles is subjected to rendering, by use of light source information whose data remain unchanged in relation to each of tiles and viewpoint information whose data consecutively change in relation to each of tiles (an upper drawing in FIG. 14). In order to achieve a similar effect, a viewpoint is made common among the respective virtual viewpoint models, and the virtual viewpoint models are conversely transformed or deformed. Further, the light source is also transformed in such a way that a correlation among a viewpoint, a light source, and a model is maintained. A transformed light source is called a virtual light source assigned to a virtual viewpoint model. This is shown in a lower drawing in FIG. 14. In order to perform these operations, information (a transformation expression, a transformation matrix, and the like) about transformation or deformation employed when a viewpoint is made common must be computed in connection with each of the virtual viewpoint models N (N=0, 1, ... ). Even in relation to a light source, information (a transformation expression, a transformation matrix, or the like) used for converting a light source in association with transformation of a viewpoint and a virtual viewpoint model must be computed. The virtual viewpoint information computing section 5 computes these pieces of information. In relation to computation, the essential requirement is to compute, for example, transformation mapping of a viewpoint vector of a viewpoint number N into a common viewpoint vector; and to use the thus-computed mapping as transformation mapping for computing a virtual viewpoint model and a virtual light source vector.

However, giving consideration merely to transformation mapping is no good. In relation to CG rendering, rendering is usually performed by use of a camera involving projection transformation (i.e., a camera having a coordinate system for effecting projection transformation when a view volume area serving as an apparent trapezoidal area is transformed into a screen coordinate system). In contrast, contrivance is required in order to simultaneously render all of the virtual viewpoint models through use of the common viewpoint.

Figure 15A:
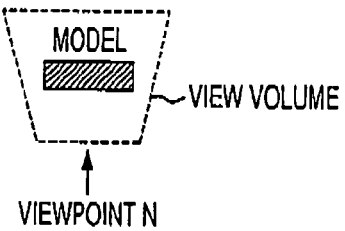
FIGS. 15A-15D are views for describing a view volume.
Figure 15B:
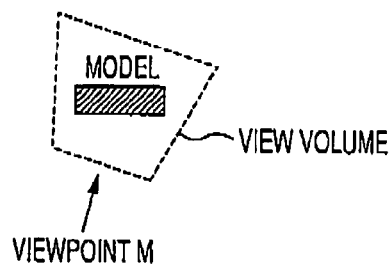
Figure 15C:
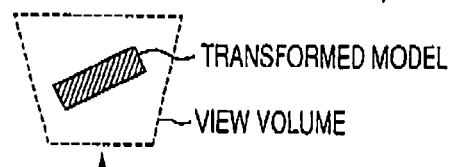
Figure 15D:
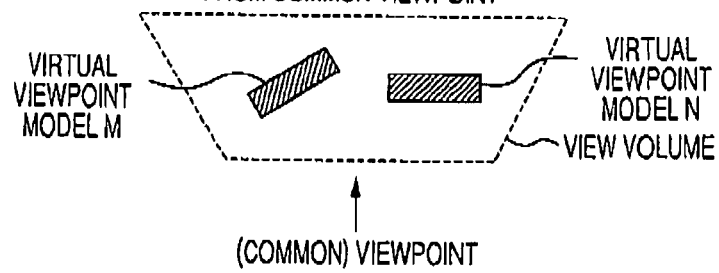

This is shown in FIGS. 15A-15D. FIG. 15A shows a relationship among a viewpoint, a CG model, and a view volume achieved when rendering is performed in connection with a tile from the viewpoint N. Likewise, FIG. 15B shows a relationship between a viewpoint, a CG model, and a view volume achieved from a viewpoint M (≠N). FIG. 15C shows that the CG space has been transformed such that the viewpoint M of FIG. 15B is oriented in the same direction where the common viewpoint is oriented. FIG. 15D shows a relationship between a group of virtual viewpoint models, the common viewpoint, and the view volumes achieved when rendering is performed from the single common viewpoint while the virtual viewpoint model N and the virtual viewpoint model M are arranged in a single CG space.

Figure 16A:
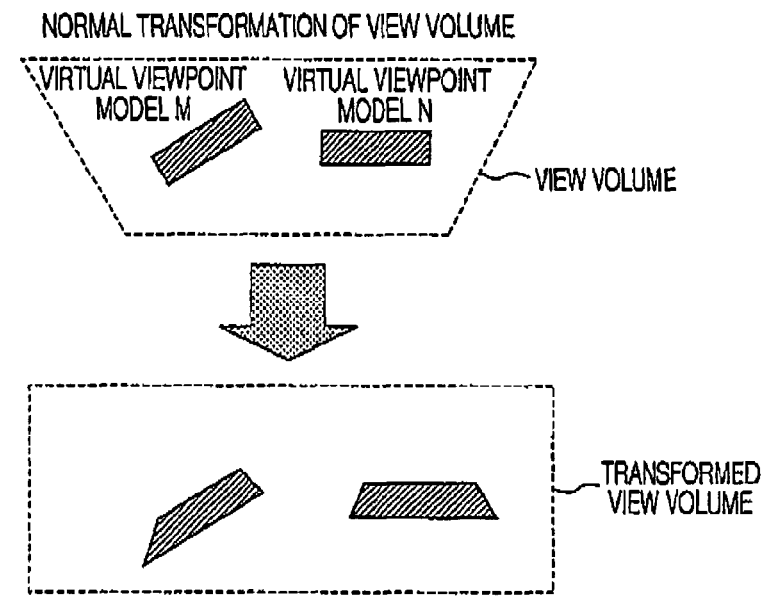
FIGS. 16A and 16B are views for describing transformation of the view volume.
Figure 16B:
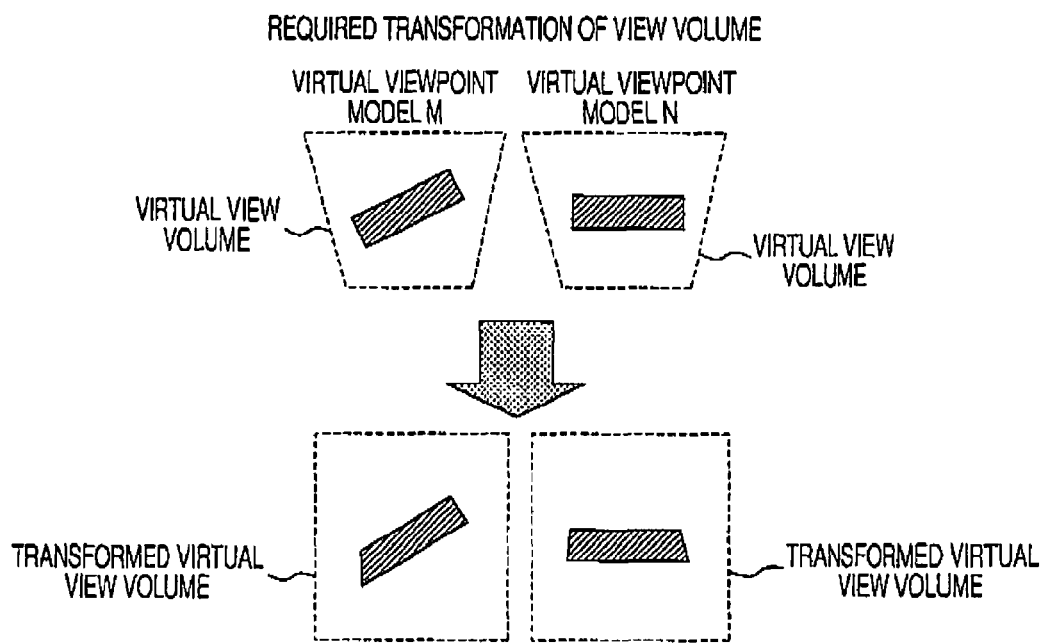

In ordinary CG rendering, there is performed projective transformation by means of which a view volume is transformed into a cubic area (or a rectangular parallelepiped), in order to correctly map the view volume—which is such an apparent trapezoidal area—into a screen coordinate system. When a space where a group of virtual viewpoint models are used, such as that shown in FIG. 15D, is subjected in unmodified form to rendering, a view volume is transformed as shown in FIG. 16A (this result of transformation leads to projective transformation). However, in reality, the same result is desired by copying rendering operation performed in each of the tiles. Therefore, the virtual viewpoint models N and M are desired to be subjected to projective transformation by means of which a view volume is transformed as shown in FIGS. 15A and 15C. In order to realize such transformation, there is the necessity to consider mutually-independent virtual view volumes for the respective virtual viewpoint models N and M as shown in FIG. 16B; and to perform projective transformation such that the virtual view volumes become cubes (or rectangular parallelepipeds) individually.

Specifically, the virtual viewpoint information computing section 5 must additionally take into consideration transformation that enables both of: (1) cancellation of an effect of transformation of a view volume shown in FIG. 16A in such a way that influence of projective transformation is correctly reflected; and (2) projective transformation allowing for virtual view volumes corresponding to respective virtual viewpoint models shown in FIG. 16B.

The process (1) is fulfilled by performing rendering operation through use of a camera which does not cause projective transformation. In ordinary computer graphics, a camera capable of effecting parallel projection (called an "Ortho camera") as well as a camera having a camera parameter which takes into consideration ordinary projection can be used as a camera which performs rendering at a certain viewpoint. Cancellation of an effect by (1) of transformation of a view volume can be performed by use of the camera parameter. In relation to (2), when a virtual view volume is considered in connection with each of the virtual viewpoint models, a projective transformation expression or a transformation matrix corresponding to the virtual view volume can be computed. This computation can be implemented as being added in the form of transformed operation to vertex processing performed during rendering operation.

The virtual viewpoint information computing section 5 attaches these pieces of information as virtual viewpoint information to data or computes these pieces of information as information to be actually applied to data.

When displaying a pseudo three-dimensional model, such as a sprite, on a 3-D display is desired, a virtual viewpoint model generated from a pseudo three-dimensional model is subjected to geometric transformation, such as affine transformation, or various transformations, thereby yielding a similar effect. It may be a case where a pseudo three-dimensional model is subjected to such transformation or deformation.

In summary, in relation to each of virtual viewpoint models, the virtual viewpoint information computing section 5 performs:

1) computation of information (including transform operation) for transforming or deforming a virtual viewpoint model used for taking a viewpoint as a common viewpoint;

2) computation of information for transforming a light source—which is used for taking a viewpoint as a common viewpoint—into a virtual light source;

3) computation of information for canceling influence of transformation on a common view volume, to thus enable projective transformation taking into account a virtual view volume; and 4) computation of information for transforming or deforming (affine transformation, or the like) used for achieving a similar effect (preferably) in connection with a pseudo three-dimensional model or the like.

Information computed through operations (1) to (4) is called virtual viewpoint information.

The above descriptions have been provided by means of taking, as an example, a view volume area corresponding to an apparent trapezoidal area which is often used in ordinary CG. However, the present invention is not limited to the view volume area. For example, the same also applies to a camera by means of which a view volume assumes an apparent trapezoidal shape in the vertical direction and an Ortho shape in the horizontal direction. So long as a space is one where mapping pertaining to projective transformation is computed, no problem arises whatever shape is assumed by the view volume. With regard to a viewpoint and a light source, the present invention is not limited to the above descriptions. Any viewpoint or any light source may be available, so long as transformation or deformation for computation is determined.

In the above descriptions, only the coordinate information included in the data have been described, but data pertaining to other vertex parameters, such as normal information, texture coordinate information, color information, and the like, have not been described. However, the same also applies to these sets of data. Virtual viewpoint information includes all of items of information pertaining to transformation or deformation required to acquire the same result as the rendering result finally generated as a tile image, by use of a group of virtual viewpoint models. All of the computing operations for computing these items of information, such as a transformation expression or a transformation matrix, are performed by the virtual viewpoint information computing section 5.

The virtual viewpoint information application section 6 will now be described.

The virtual viewpoint information application section 6 is for applying corresponding virtual viewpoint information computed by the virtual viewpoint information computing section 5 to each of the models belonging to the group of models acquired from the virtual viewpoint model arrangement section 4.

Specifically, the virtual viewpoint information computed by the virtual viewpoint information computing section 5 is applied to each of the virtual viewpoint models, thereby achieving a condition where each of the virtual viewpoint models arranged within the CG space can be subjected to vertex processing, such as writing transform operation, in consideration of the virtual light source and the virtual view volume. The virtual viewpoint models are distinguished from each other by use of the ID information added by the virtual viewpoint model generation section 2. As an application method, data, such as coordinate values actually included in a virtual viewpoint model, may be directly modified. Alternatively, a transformation matrix or a transformation expression may have been previously attached to data, thereby creating a condition where computation becomes possible through computing operation performed during actual rendering operation. So long as there has previously been created a condition where a virtual viewpoint model can be properly subjected to vertex processing at the time of actual rendering of computer graphics, the virtual viewpoint information application section 6 can be used without being limited in terms of a technique.

Next, the virtual viewpoint model area information computing section 7 will be described.

The virtual viewpoint model area information computing section 7 is for computing rendering areas of respective virtual viewpoint models from the 3-D display information.

In relation to a tile image corresponding to an output result for 3-D display, not all of rendering results of computer graphics acquired from a viewpoint of each tile are not always stored in each tile. For example, a tile image, such as that shown in FIG. 17A, is available (an explanation is provided here by means of taking, as an example tile image, a tile image formed from two tiles). The tile image is an example tile image comprising a tile formed from a portion of a CG rendering result (an area enclosed by a dotted line in the drawing), such as that shown in FIG. 17B; and a tile formed from a portion of a CG rendering result such as that shown in FIG. 17C. Thus, it may also be possible that only a portion of a view area (an area captured by a camera set at a certain viewpoint) is extracted as a tile, to thus constitute a final tile image.

The virtual viewpoint model area information computing section 7 is for performing such area control for each of virtual viewpoint models.

Figure 18A:
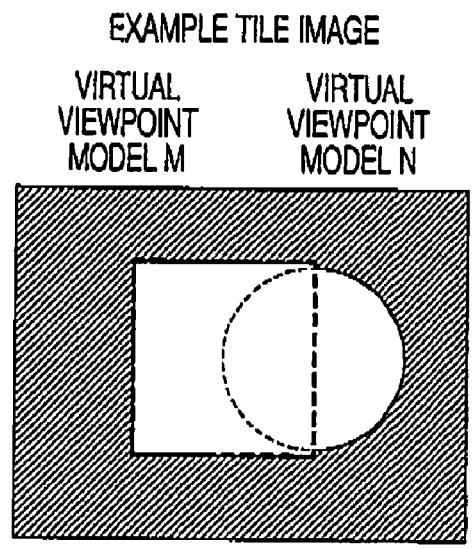
FIGS. 18A-18C are views for describing a rendering area for a virtual viewpoint model.
Figure 18B:
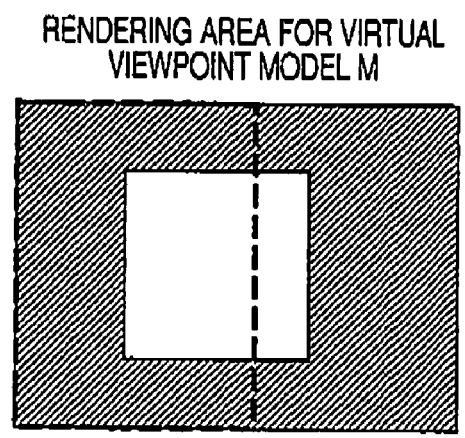
Figure 18C:
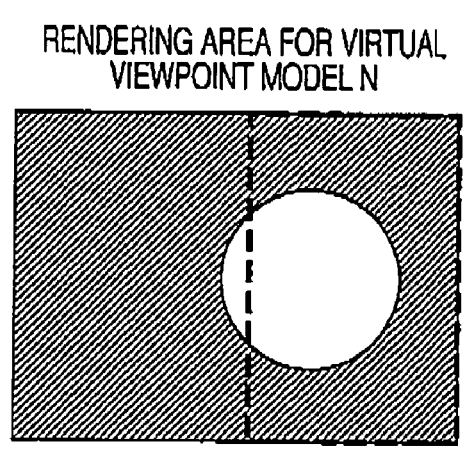

In such a case, as shown in FIG. 18A, virtual viewpoint models are arranged so as to include an overlap within a single 3-D space. As shown in FIG. 18B, under such conditions, the entirety of the virtual viewpoint model M is not rendered, but only an area enclosed by a dotted line in the drawing must be rendered. Likewise, as shown in FIG. 18C, only an area of the virtual viewpoint model N enclosed by a dotted line must be rendered. The virtual viewpoint model area information computing section 7 is for computing information about a rendering area of each of the virtual viewpoint model. The area is computed by use of the panel information included in the 3-D display information, the number of parallax errors, a visual range, an expression depth, tile image format information, or the like. Typically, rectangular position information about an area where each of the virtual viewpoint models is to be rendered is computed. Only an area within a rectangular area of interest can be rendered without involvement of deformation of a geometry of a virtual viewpoint model by using the rectangular position information as information about a clipping area, a scissoring area, a viewport area, a stencil buffer, and the like, when the CG rendering section 8 to be described later, for example, actually performs rendering.

However, the position is not necessarily limited to a rectangular shape, and information about an arbitrary area can be computed.

The CG rendering section 8 will be described.

The CG rendering section 8 is for perform CG rendering operation by use of CG space information (including common viewpoint information) acquired from the virtual viewpoint information application section 6, virtual viewpoint model group data, virtual viewpoint model information, and the information about the area—where a virtual viewpoint model is to be rendered—acquired from the virtual viewpoint model area information computing section 7.

Specifically, a scene acquired from a common viewpoint is rendered by use of the thus-acquired virtual viewpoint model data. A general-purpose graphics processing unit (GPU) is used for rendering.

In relation to vertex processing of rendering operation, vertex processing, such as transform operation, lighting, and the like, is performed by use of the virtual viewpoint information applied by the virtual viewpoint information application section 6. Specifically, for example, vertex processing is performed by use of a vertex shader of the GPU, wherein information about the virtual light source, information about transformation or deformation of a model, information about a virtual view volume, and the like, are applied to each of the virtual viewpoint models obtained as virtual viewpoint information. At this time, the virtual viewpoint models are distinguished from each other by use of, e.g., the ID information added to the data by the virtual viewpoint model generation section 2.

Pixel processing in rendering operation is performed by use of, e.g., the pixel shader of the GPU. Pixel processing using virtual viewpoint information is applied, for each virtual viewpoint model, to a group of parameters belonging to a virtual viewpoint model of interest. More specifically, pixel processing, such as complementation of texture coordinates, making of reference to a texture, computation of a color, and the like, is performed by use of a group of parameters belonging to a virtual viewpoint model of interest. In connection with the group of parameters belonging to the virtual viewpoint model of interest, a result of vertex processing of the virtual viewpoint model of interest is computed by means of a device called a rasterizer in the GPU during above-described vertex processing.

At this time, pixel processing is performed in consideration of information about a rendering area for each of the virtual viewpoint models computed by the virtual viewpoint model area information computing section 7. Specifically, area control is performed by use of any of techniques: namely, a technique of controlling a pixel processing area for each virtual viewpoint model by use of a stencil function, such as a stencil buffer, to thus subject a required area to writing; a technique of performing control operation by means of rendering the outside of an area transparent through use of an α value; a technique of subjecting to writing only a common area between information about a maximum rendering area for a virtual viewpoint model distinguished from the ID information about the virtual viewpoint model and the area information acquired from the virtual viewpoint model area information computing section 7; and the like. The thus-described area control techniques are mere examples, and the technique is not limited to these examples.

Through the above processes, an image acquired as a result of rendering turns into a tile image itself.

The point is that, when compared with the related-art technique of producing a tile image by means of the CG rendering section repeatedly performing rendering operations in equal number to viewpoints, a rendering result corresponding to a tile image is acquired by means of single rendering from a common viewpoint by use of virtual viewpoint models, virtual viewpoint information, virtual viewpoint model area information, and the like.

The example using the general-purpose GPU has been described in the above. However, the present invention is not limited to the general-purpose GPU, but custom-designed hardware may also be used, or all of processing operations may be performed through software processing.

Rendering can be performed inexpensively, at high speed without use of custom-designed hardware, so long at a general-purpose GPU is used. Therefore, the CG image generation apparatus for a 3-D display of the present invention can be implemented inexpensively.

According to the embodiment of the present invention described above, a CG image for use with a 3-D display can be produced through single rendering operation without involvement of repetition of rendering operation in equal number to viewpoints required by the related-art technique. As a result, very high-speed production of a CG image for use with a 3-D display has become feasible even when a general-purpose GPU is used. According to the related-art technique, in order to generate a tile image, there has been required processing under a circumstance which is not assumed during ordinary CG rendering operation, such as repetition of rendering operation under a special circumstance. Therefore, difficulty is encountered in fully exhibiting the performance of the GPU. Consequently, even when a very-high-speed GPU is used, difficulty is encountered in producing a CG image for use with a 3-D display at high speed. Although, according to the embodiment of the present invention, various processing operations intended to perform single rendering operation are added, rendering operation is required only once. Therefore, a general-purpose CPU can be used under the circumstance assumed in relation to ordinary CG rendering operation. A CG image for use with a 3-D display can be produced at high speed by use of a general-purpose GPU. As a result, processing can be performed by use of an existing GPU without employment of a new device specifically designed for CG rendering. An attempt can be made to curtail cost required to implement an apparatus for producing a CG image for use with a 3-D display of the embodiment of the present invention. Moreover, an improvement in the speed of rendering operation is expected, and hence significant improvement in performance can be attained.

Modification of the Embodiment

Figure 19:
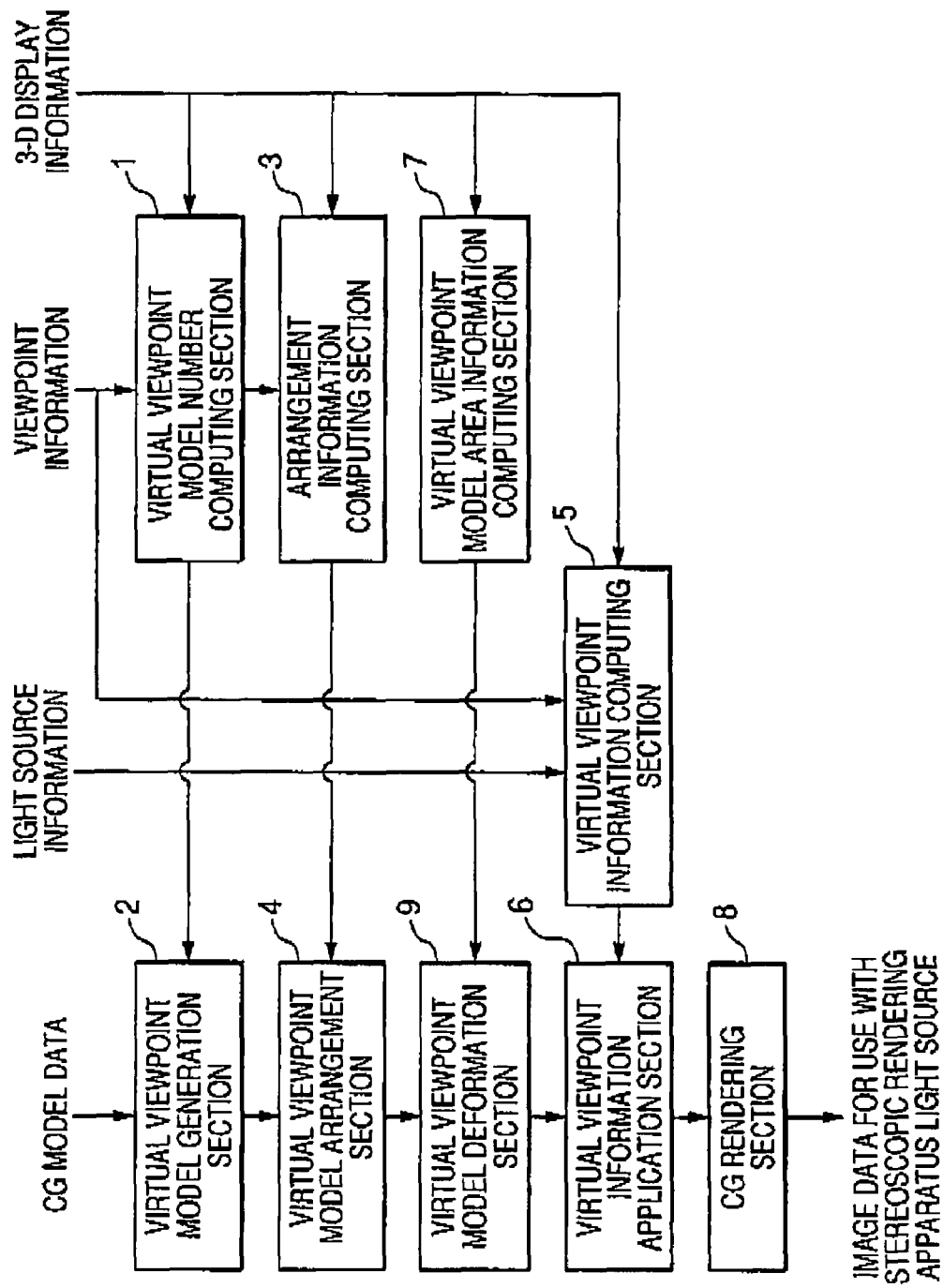
FIG. 19 is a view schematically showing an example configuration of an apparatus for generating a CG image for use with a 3-D display of a modification of the embodiment of the present invention.

FIG. 19 is a block diagram pertaining to the entirety of an apparatus for generating a CG image for use with a 3-D display according to a modification of the embodiment.

The modification of the embodiment of the present invention corresponds to the apparatus for generating a CG image for use with a 3-D display of the present invention being additionally provided with a virtual viewpoint model deformation section 9. Moreover, the virtual viewpoint model area information computing section 7 is connected to the CG rendering section 8 in the embodiment. However, the present modification differs from the embodiment in that the newly-added virtual viewpoint model deformation section 9 is connected to the virtual viewpoint model area information computing section 7. In other respects, the apparatus is identical with that of the embodiment, and hence an explanation is given solely to the difference in subsequent descriptions.

First, the virtual viewpoint model area information computing section 7 will be described.

The virtual viewpoint model area information computing section 7 is for computing a rendering area for each of the virtual viewpoint models from 3-D display information, in completely the same manner as in the embodiment. Computed information about a virtual viewpoint model area is sent to the virtual viewpoint model deformation section 9.

The virtual viewpoint model deformation section 9 will now be described.

The virtual viewpoint model deformation section 9 is for transforming the group of virtual viewpoint models arranged in the CG space by the virtual viewpoint model arrangement section 4, by use of the information about the area for each of the virtual viewpoint models computed by the virtual viewpoint model area information computing section 7.

As has been described in connection with the descriptions about the virtual viewpoint model area information computing section 7 of the embodiment, not all of the virtual viewpoint models are subjected to rendering. In the embodiment, the CG rendering section 8 has limited an area to be subjected to rendering, by use of a function such as clipping, scissoring, a viewport, a stencil buffer, and the like. However, as compared with the embodiment, in the modification a geometry of virtual viewpoint model data is actually transformed by use of the computed information about the area for each of the virtual viewpoint models. This processing is performed by the virtual viewpoint model deformation section 9. For example, the virtual viewpoint model N shown in FIG. 18 is rendered as a sphere whose circular (spherical) arc is partially cut. However, in the embodiment, virtual viewpoint model data are processed in the form of circular (spherical) geometry data. In contrast, in the modification, the virtual viewpoint model data are actually deformed, to thus achieve geometry data—whose circular (spherical) arc is partially cut—at a data level. When the virtual viewpoint data are deformed in such a manner, the CG rendering section 8 does not need to take into account control of a rendering range of the virtual viewpoint model, and the essential requirement is to simply render the virtual viewpoint model.

For the sake of convenience, the descriptions have been provided by use of the example where a tile image for use with a 3-D display of type II is generated. However, the type of the 3-D display is not limited to type II. A tile image can be used similarly for a 3-D display which generates a stereoscopic image by means of performing CG rendering from a plurality of viewpoints, regardless of the type of the 3-D display such as a 3-D display of binocular type, a 3-D display of multiocular type, or the like. Further, an image to be produced is not limited to a tile image, as well. An image of arbitrary format can be subjected to similar processing.

Processing of the embodiment of the present invention is implemented in the form of a program which can be executed by a computer, and the program can also be realized in the form of a computer-readable storage medium.

The storage medium of the present invention is of any storage type, so long as the medium is a storage medium which can store a program and can be read by a computer or a built-in system, such as a magnetic disk, a floppy (R) disk, a hard disk drive, an optical disk (CD-ROM, CD-R, DVD, or the like), a magneto-optical disk (MO or the like) semiconductor memory, or the like.

A portion of processing for implementing the embodiment may also be performed by means of an OS (Operating System) running in a computer in accordance with a command from a program installed from a storage medium into the computer or a built-in system, database management software, middle ware (MW) such as a network, or the like.

Moreover, the storage medium of the present invention of the present patent application is not limited to a medium which is independent of a computer or a built-in system. The storage medium includes a storage medium which downloads a program transmitted over a LAN, the Internet, or the like, and stores or temporarily stores the thus-downloaded program.

The number of storage medium is not limited to one. A case where processing of the embodiment is performed from a plurality of mediums may also be used as a storage medium of the present invention. The medium may be of any type.

The computer or the built-in system is for performing processing of the embodiment in accordance with a program stored in the storage medium. The computer or the system may be of any configuration, for example, a single apparatus such as a personal computer, a microcomputer, or the like; a system where a plurality of devices are connected through a network; or the like.

The computer is not limited to a personal computer but includes an arithmetic processing device included in information processing equipment, a microcomputer, or the like. The computer is a generic name for equipment or a device which can fulfill the functions of the present invention by means of a program.

The present invention is not limited to the above embodiment and is susceptible to various deformations in an embodiment stage without departing from the gist of the present invention. The embodiment includes the invention of various stages, and various inventions can be extracted by means of an appropriate combination of a plurality of disclosed constituent elements. For example, even when some are deleted from all of the constituent elements described in the embodiment, (at least one of) the problems mentioned in the section "Problems That the Present Invention is to Solve" can be resolved. When (at least one of) advantages mentioned in the section "Advantage of the Present Invention" are yielded, the deleted constituent elements can be extracted as the invention.

What is claimed is:

1. A computer apparatus for generating a computer graphics image to be displayed on a three-dimensional display device, the computer apparatus comprising:
a processor coupled to the three-dimensional display device, wherein the processor executes:
a number computing unit that computes, based on three-dimensional display information, a number of pieces of a plurality of three-dimensional virtual viewpoint models to be generated, wherein the three-dimensional display information includes a number of parallax errors of the computer graphics image to be generated, wherein the number of pieces of the plurality of three-dimensional virtual viewpoint models is less than the number of the parallax errors;
a generation unit that generates, based on computer graphics model data, the plurality of three-dimensional virtual viewpoint models for the number of pieces computed by the number computing unit, wherein the plurality of three-dimensional virtual viewpoint models are generated based on display information acquired from a single viewpoint;
an arrangement information computing unit that computes, based on generation image information included in the three-dimensional display information, arrangement information to be used for arranging a group of the plurality of three-dimensional virtual viewpoint models within a computer graphics space;
an arrangement unit that arranges, within the computer graphics space, data pertaining to the group of the plurality of three-dimensional virtual viewpoint models generated by the generation unit in accordance with the arrangement information computed by the arrangement information computing unit;
an information computing unit that computes virtual viewpoint information about each of the plurality of three-dimensional virtual viewpoint models, based on information regarding a light source and viewpoints to be generated as the computer graphics image and the three-dimensional display information;
an information application unit that applies the virtual viewpoint information computed by the information computing unit to each of the corresponding plurality of three-dimensional virtual viewpoint models included in the group of the virtual viewpoint models computed by the generating unit;
an area information computing unit that computes a rendering area for each of the plurality of three-dimensional virtual viewpoint models based on the three-dimensional display information; and
a rendering unit that renders the computer graphics image based on computer graphics space information, which includes the virtual viewpoint information about each of the plurality of three-dimensional virtual viewpoint models, and virtual viewpoint model group information, which includes the information regarding the light source and the viewpoints to be generated as the computer graphics image, acquired from the information application unit and on the rendering area computed by the model area information computing unit,
wherein the information application unit applies the virtual viewpoint information computed by the information computing unit to each of the corresponding plurality of three-dimensional virtual viewpoint models by performing an information application method including:
computing information for transforming or deforming each of the plurality of three-dimensional virtual viewpoint models,
computing information for transforming the light source into a virtual light source, and
computing information for a virtual view volume.

2. A computer-implemented method for generating a computer graphics image to be displayed on a three-dimensional display device, the method comprising the steps performed by a computer of:
computing, based on three-dimensional display information, a number of pieces of a plurality of three-dimensional virtual viewpoint models to be generated, wherein the three-dimensional information includes a number of parallax errors of the computer graphics image to be generated, wherein the number of the pieces of the plurality of three-dimensional virtual viewpoint models is less than the number of the parallax errors;
generating, based on computer graphics model data, the plurality of three-dimensional virtual viewpoint models for the computed number of pieces, wherein the plurality of three-dimensional virtual viewpoint models are generated based on display information acquired from a single viewpoint;
computing, based on generation image information included in the three-dimensional display information, arrangement information to be used for arranging a group of the plurality of three-dimensional virtual viewpoint models within a computer graphics space;
arranging, within the computer graphics space, data pertaining to the group of the plurality of three-dimensional virtual viewpoint models in accordance with the arrangement information;
computing virtual viewpoint information about each of the plurality of three-dimensional virtual viewpoint models, based on information regarding a light source and viewpoints to be generated as the computer graphics image and the three-dimensional display information;
applying the virtual viewpoint information to each of the corresponding plurality of three-dimensional virtual viewpoint models included in the group of the computed virtual viewpoint models;
computing a rendering area for each of the plurality of three-dimensional virtual viewpoint models based on the three-dimensional display information; and
rendering the computer graphics image based on computer graphics space information, virtual viewpoint model group information, and the rendering area, wherein applying the virtual viewpoint information to each of the corresponding plurality of three-dimensional virtual viewpoint models comprises:
computing information for transforming or deforming each of the plurality of three-dimensional virtual viewpoint models;
computing information for transforming the light source into a virtual light source; and
computing information for a virtual view volume.

3. A computer apparatus for generating a computer graphics image to be displayed on a three-dimensional display device, the computer apparatus comprising:
a processor coupled to the three-dimensional display device, wherein the processor executes:
a number computing unit that computes, based on three-dimensional display information, a number of pieces of a plurality of three-dimensional virtual viewpoint models to be generated;
a generation unit that generates, based on computer graphics model data, the plurality of three-dimensional virtual viewpoint models for the number of pieces computed by the number computing unit, wherein the plurality of three-dimensional virtual viewpoint models are generated based on display information acquired from a single viewpoint;
an arrangement information computing unit that computes, based on generation image information included in the three-dimensional display information, arrangement information to be used for arranging a group of the plurality of three-dimensional virtual viewpoint models within a computer graphics space;
an arrangement unit that arranges, within the computer graphics space, data pertaining to the group of the plurality of three-dimensional virtual viewpoint models generated by the generation unit in accordance with the arrangement information computed by the arrangement information computing unit;
an information computing unit that computes virtual viewpoint information about each of the plurality of three-dimensional virtual viewpoint models, based on information regarding a light source and viewpoints to be generated as the computer graphics image and the three-dimensional display information;
an information application unit that applies the virtual viewpoint information computed by the information computing unit to each of the corresponding plurality of three-dimensional virtual viewpoint models included in the group of the virtual viewpoint models computed by the generating unit;
an area information computing unit that computes a rendering area for each of the plurality of three-dimensional virtual viewpoint models based on the three-dimensional display information; and
a rendering unit that renders the computer graphics image based on computer graphics space information, which includes the virtual viewpoint information about each of the plurality of three-dimensional virtual viewpoint models, and virtual viewpoint model group information, which includes the information regarding the light source and the viewpoints to be generated as the computer graphics image, acquired from the information application unit and on the rendering area computed by the model area information computing unit,
wherein the information application unit applies the virtual viewpoint information computed by the information computing unit to each of the corresponding plurality of three-dimensional virtual viewpoint models by performing an information application method including:
computing information for transforming or deforming each of the plurality of three-dimensional virtual viewpoint models,
computing information for transforming the light source into a virtual light source, and
computing information for a virtual view volume.

4. The computer apparatus of claim 3, wherein the computer graphics space includes one or more tile images, and wherein each of the plurality of three-dimensional virtual viewpoint models is arranged in an area corresponding to a tile of the one or more tile images.

5. A computer-implemented method for generating a computer graphics image to be displayed on a three-dimensional display device, the method comprising the steps performed by a computer of:
computing, based on three-dimensional display information, a number of pieces of a plurality of three-dimensional virtual viewpoint models to be generated;
generating, based on computer graphics model data, the plurality of three-dimensional virtual viewpoint models for the computed number of pieces, wherein the plurality of three-dimensional virtual viewpoint models are generated based on display information acquired from a single viewpoint;
computing, based on generation image information included in the three-dimensional display information, arrangement information to be used for arranging a group of the plurality of three-dimensional virtual viewpoint models within a computer graphics space;
arranging, within the computer graphics space, data pertaining to the group of the plurality of three-dimensional virtual viewpoint models in accordance with the arrangement information;
computing virtual viewpoint information about each of the plurality of three-dimensional virtual viewpoint models, based on information regarding a light source and viewpoints to be generated as the computer graphics image and the three-dimensional display information;
applying the virtual viewpoint information to each of the corresponding plurality of three-dimensional virtual viewpoint models included in the group of the computed virtual viewpoint models;
computing a rendering area for each of the plurality of three-dimensional virtual viewpoint models based on the three-dimensional display information; and
rendering the computer graphics image based on computer graphics space information, virtual viewpoint model group information, and the rendering area,
wherein applying the virtual viewpoint information to each of the corresponding plurality of three-dimensional virtual viewpoint models comprises:
computing information for transforming or deforming each of the plurality of three-dimensional virtual viewpoint models;
computing information for transforming the light source into a virtual light source; and
computing information for a virtual view volume.

6. The computer-implemented method of claim 5, wherein the computer graphics space includes one or more tile images, and wherein each of the plurality of three-dimensional virtual viewpoint models is arranged in an area corresponding to a tile of the one or more tile images.

* * * * *